US009583025B2

United States Patent
Kellum et al.

(10) Patent No.: US 9,583,025 B2
(45) Date of Patent: Feb. 28, 2017

(54) SYSTEM, COMPONENTS AND METHODOLOGIES FOR TRAINING AND TESTING ON CARDIAC COMPRESSIONS

(75) Inventors: Michael Kellum, Whitewater, WI (US); Gregory Wayne Parkhurst, Brooklyn Park, MN (US)

(73) Assignee: Scientific Pathways International, LLC, Lake Geneva, WI (US)

( * ) Notice: Subject to any disclaimer, the term of this patent is extended or adjusted under 35 U.S.C. 154(b) by 606 days.

(21) Appl. No.: 13/876,910

(22) PCT Filed: Sep. 20, 2011

(86) PCT No.: PCT/US2011/052361
§ 371 (c)(1),
(2), (4) Date: Aug. 14, 2013

(87) PCT Pub. No.: WO2012/047504
PCT Pub. Date: Apr. 12, 2012

(65) Prior Publication Data
US 2014/0057235 A1 Feb. 27, 2014

Related U.S. Application Data

(60) Provisional application No. 61/389,896, filed on Oct. 5, 2010.

(51) Int. Cl.
G09B 23/28 (2006.01)
(52) U.S. Cl.
CPC ................... G09B 23/288 (2013.01)
(58) Field of Classification Search
CPC ...... G09B 23/28; G09B 23/288; G09B 23/30; G09B 23/32
See application file for complete search history.

(56) References Cited

U.S. PATENT DOCUMENTS 6,761,637 B2 * 7/2004 Weston ................... A63F 13/06
463/1
8,734,161 B1 * 5/2014 Centen ................ G09B 23/288
434/262

(Continued)

OTHER PUBLICATIONS

Int'l Search Report and Written Opinion issued in App. No. PCT/US2011/052361 (2012).

*Primary Examiner* — Timothy A Musselman
(74) *Attorney, Agent, or Firm* — Jansson Munger McKinley & Kirby Ltd.

(57) ABSTRACT

Disclosed are methodologies, a system and components thereof and associated computer programs for providing training/testing of one or more users performing treatment of Sudden Cardiac Arrest (SCA) victims. The system provides computer controlled interactive instruction and testing methodologies that enable one or more users to be trained and/or tested using a plurality of mannequins including circuitry and hardware that enable each users compressions to analyzed for rate, depth and recoil to ensure that each user is performing the chest compressions properly. The data collected for determining rate, depth and recoil are collected via mannequin-specific hardware and electronics that utilize a plurality of magnets provided in proximity to a Hall Effect sensor. Data is collected at each mannequin and transmitted to at least one computer processing unit operating to receive, collect, analyze and display the data as well as store data for subsequent use in individualized training and certification of users.

27 Claims, 21 Drawing Sheets

(56) References Cited

U.S. PATENT DOCUMENTS

| | | |
|---|---|---|
| 2008/0293025 A1 | 11/2008 | Zamierowsi et al. |
| 2009/0035730 A1* | 2/2009 | Lindero .......................... 434/22 |
| 2009/0035740 A1 | 2/2009 | Reed et al. |
| 2009/0061404 A1 | 3/2009 | Toly |
| 2009/0148822 A1* | 6/2009 | Eggert ................ G09B 23/281 |
| | | 434/271 |
| 2009/0155753 A1* | 6/2009 | Ales et al. ................... 434/236 |
| 2010/0004710 A1 | 1/2010 | Kellum |

* cited by examiner

100

SYSTEM, COMPONENTS AND METHODOLOGIES FOR TRAINING AND TESTING ON CARDIAC COMPRESSIONS

CROSS REFERENCE TO RELATED APPLICATIONS

This application is a U.S. nationalization under 35 U.S.C. §371 of International Application No. PCT/US2011/052361, filed Sep. 20, 2011, which claims the benefit of priority under 35 U.S.C. §119(e) to U.S. Provisional Application No. 61/389,896, filed Oct. 5, 2010. The disclosures set forth in the referenced applications are incorporated herein by reference in their entireties, including all information as originally submitted to the United States Patent and Trademark Office.

BACKGROUND

Sudden Cardiac Arrest (SCA) is a leading single cause of death in this country. Between 350,000 and 450,000 individuals a year, or more than 1000 per day, fall victim to this disease, despite 4 decades of education and systematic interventions, survival rates have not improved: about 95% of SCA victims will die.

One of the aspects of caring for a victim of SCA is the critical importance of time. SCA occurs suddenly, with little or no warning: the victim simply collapses and blood flow to the heart and brain stops abruptly. The window for initiating treatment is measured in minutes—few survive if treatments are delayed beyond 8-10 minutes. The victim is, therefore, totally dependent upon the actions of those who witness the cardiac arrest. This is, in turn, influenced by the location of the event: 15-20% occur in public places (where witnesses are more likely to be present) while the remaining 80-85% occur in private locations, the most common being sites of residence, where 40% of events are unwitnessed. Survival rates for unwitnessed events are uniformly almost zero.

When an event is witnessed by a layperson, interventions become available that dramatically improve survival: recognition of the event as a cardiac arrest, activation of the EMS system by calling 911, and provision of "CPR" until help arrives. Recognizing a collapse as a possible SCA depends almost totally upon educational programs aimed at the layperson. Calling for help as soon as possible after recognition may be critical because the majority of survivors of SCA have a cardiac rhythm that responds to defibrillation. Education is also the primary modality for improving performance in this activity; but in specialized settings (e.g. industry, schools, sports events, etc.), pre-planned methodologies similar to fire drills could be developed.

A witness who performs "CPR" dramatically increases the odds of survival. In fact, it is the single most valuable contribution to survival, increasing odds of success up to 4.5. fold. Some witnesses have received training in CPR but even in communities with decades of public education, the percentage of individuals trained is rarely over 30%. Typically only 15% are trained.

Simplification of layperson (and/or initial responder) CPR training to include only activities that are crucial to survival at the time of their contact with the patient (i.e. to "call 911" and "provide chest compressions") should improve the number of willing and competent persons. This simplification should also result in more "CPR" actually being delivered to victims because the breathing component in traditional "CPR" in not only difficult to teach and recall but very difficult to perform adequately. Having to breathe for SCA victims results in many witnesses forgoing any CPR activities.

Evidence also indicates that breathing may not only be unnecessary in the initial minutes of an arrest but the effort is indeed detrimental because it takes valuable time away from the crucial activity of circulating blood to the brain and heart. See, for example, "Cardiocerebral resuscitation: a new approach to out-of-hospital cardiac arrest," Ewy, Gordon A. and Kellum, Michael J., University of Arizona Sarver Heart Center, University of Arizona, Tucson, Ariz., American Heart Association, Dec. 10, 2004. See also, "Cardiopulmonary resuscitation by bystanders with chest compression only (SOS-KANTO): an observational study," The Lancet, Mar. 17, 2007.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with the disclosure, training and testing systems and methodologies are provided for training and testing users in performing resuscitation by chest compressions without mouth-to-mouth ventilation (i.e., cardiac-only resuscitation) of SCA victims.

The system provides computer controlled interactive instruction and testing methodologies that enable one or more users to be trained and/or tested using a plurality of mannequins each including circuitry and hardware that enable each user's compressions to be analyzed for rate, depth and recoil data to ensure that each user is performing the chest compressions properly. The data collected for determining rate, depth and recoil are collected via the mannequin-specific hardware and electronics that utilize a plurality of magnets provided in proximity to a Hall Effect sensor.

Data is collected at each mannequin and analyzed and displayed at the mannequin and/or transmitted to at least one computer processing unit operating to receive, collect, analyze and display the data as well as store data for subsequent use in individualized training and certification of users.

BRIEF DESCRIPTION OF THE DRAWINGS

A more compete understanding of the present invention and the utility thereof may be acquired by referring to the following description in consideration of the accompanying drawings, in which like reference numbers indicate like features.

DETAILED DESCRIPTION

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

In conventional CPR training, training classes are led by an instructor utilizing mannequins. Such classes are expensive and take time out of attendees' and training personnel's schedules. Moreover, training with regard to the quality of chest compressions is for the most part defined subjectively, if it is critiqued at all.

As a result, there is minimal or no meaningful training or analysis regarding the quality of chest compressions performed by attendees. However, poor compression technique is not only very common among CPR trainees but it also robs CPR of its effectiveness as a lifesaving medical treatment.

Although conventional devices exist that can be utilized between a trainee and the mannequin to detect and provide feedback to the trainee, such devices are expensive, non-robust and suffer from the potential for various sources of measurement error. Thus, such devices are not available to the vast majority of students and of little use to those that have access.

Moreover, another significant issue with training using mannequins is that conventional mannequins are passive units. However, what would be particularly useful would be a mannequin that can be used independently of an instructor and that can provide objective analysis and feedback of compression performance to a trainee on an individualized basis.

Figure 1:
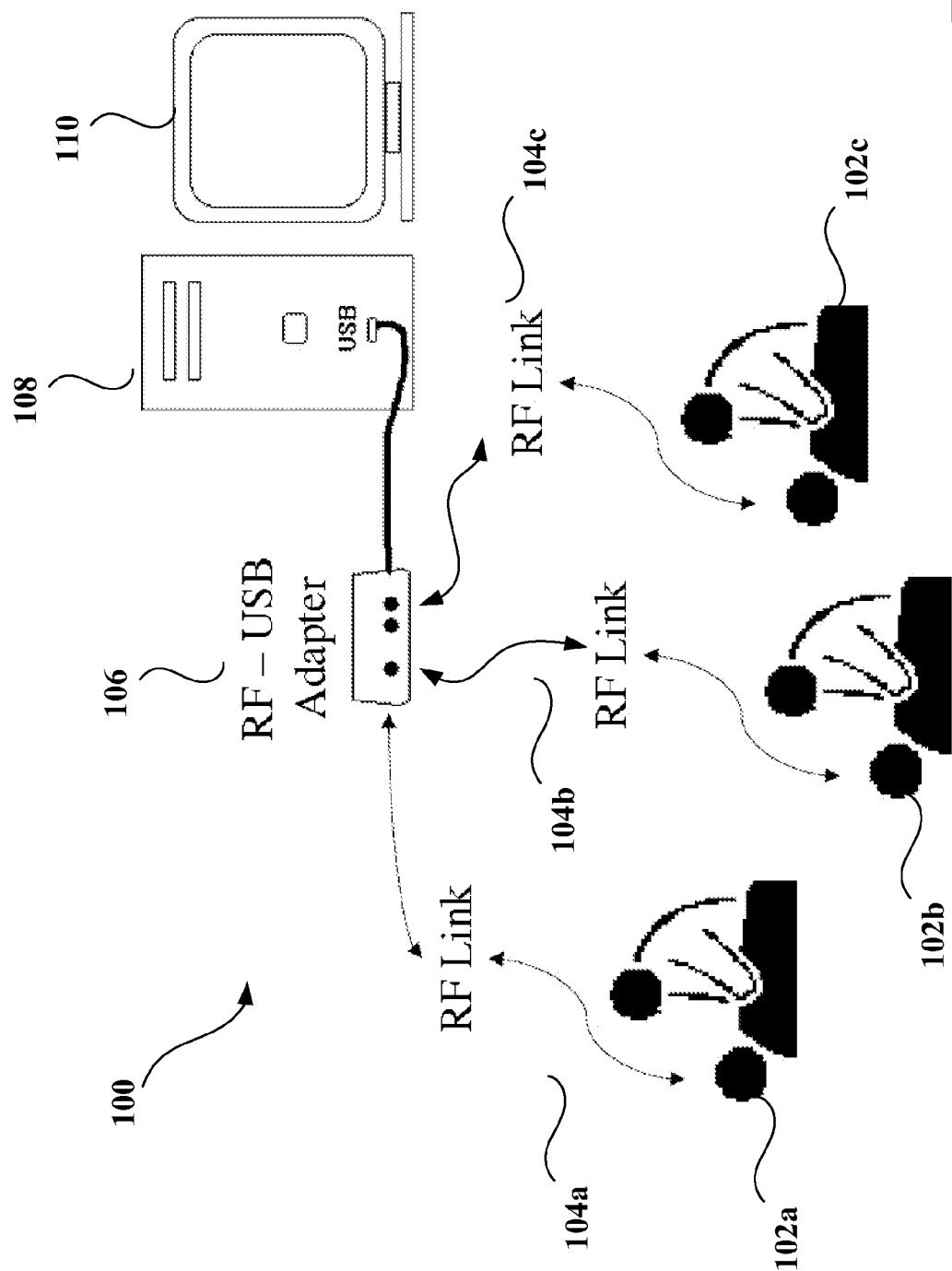
FIG. 1 illustrates one example of a training/testing system provided in accordance with at least one disclosed system embodiment.

With this understanding of the deficiencies of conventional CPR training in mind, FIG. 1 illustrates one example of a training/testing system provided in accordance with at least one disclosed system embodiment. As shown in FIG. 1, the system 100 may be comprised of a plurality of mannequins 102a, 102b, 102c, each coupled to a Radio Frequency (RF) antenna 106 via a plurality RF links 104a, 104b, 104c, respectively. The RF antenna 106 may include or be coupled to a USB adaptor that enables connection to, and communication with a central CPU 108 via a USB port. It should be appreciated that, alternatively, another type of port and connector besides USB may be used.

It should be appreciated that the RF links 104a-c may be provided via WiFi (e.g., implementing IEEE 802.11 standards), a Wide Area Network (WAN), a Wireless Local Area Network (WLAN) or any other type of network configuration that provides the ability to communicate wirelessly. Moreover, it should be appreciated that, although not optimal for ease of use, the mannequins 102a-c may be coupled directly to the central CPU 108 based on cost or other implementation considerations.

The CPU 108 in turn is coupled to a display 110 for display of data communicated from the mannequins 102a-c and analyzed and displayed via one or more software applications.

It should be appreciated that the central CPU 108 may be, for example, a general purpose computer, such as any programmable machine that receives input, stores and manipulates data, and provides output in a useful format, a special purpose computer including, e.g., one or more microprocessors programmed to perform certain operations, or any other type of particular or programmable machine.

Further, it should be appreciated that the display 110 may be, for example, any display device configured to enable output of data for presentation of information for visual reception, acquired, stored, or transmitted in various forms. It should further be appreciated that the display 110 may be a touch screen that enables selection of various options displayed on the display 110 via interaction by touching the screen to select the option. Alternatively, the display 110 may be a conventional computer screen that enables display or output of data and information via, for example, a computer monitor, a Personal Data Assistant (PDA), a display associated with a special purpose computer, etc.

Further description of the type of operations performed by software and hardware resident in each of the mannequins 102a-c and the central CPU 108 is explained in more detail in connection with FIGS. 3-12. Likewise, further description of the types of data and format thereof displayed on display 110 is explained in more detail in connection with FIGS. 13-25.

Figure 2A:
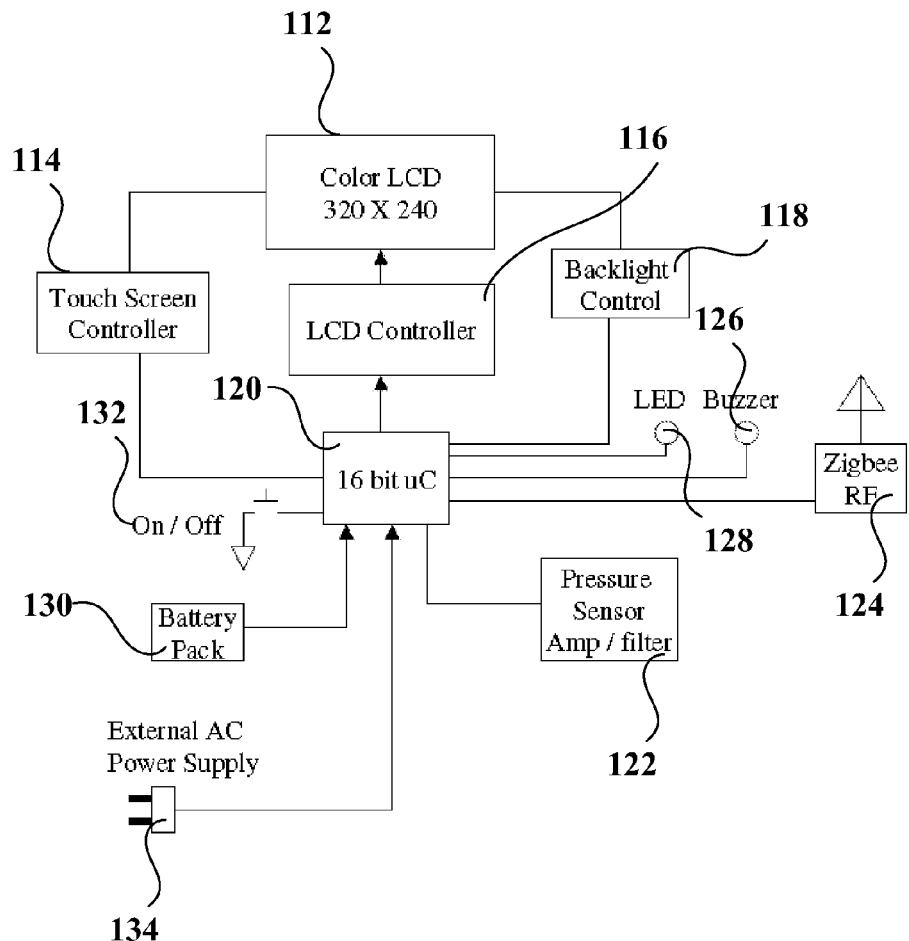
FIG. 2A illustrates an example of functional modules of the hardware and software components provided in association with each mannequin used in the system illustrated in FIG. 1.

FIG. 2A illustrates an example of various functional modules of the hardware and software components that may be provided in association with each mannequin used in the system illustrated in FIG. 1.

As shown in FIG. 2A, each mannequin 102a-c may include a color Liquid Crystal Display (LCD), e.g., 320×240 pixels in size, for displaying instructions, information and data associated with operation of the mannequin as a training and testing tool. As such, the LCD may be implemented with a Touch Screen Controller 114 and an LCD Controller 116 to provide touch screen functionality wherein a user may interact with the touch screen to select options and input data into a software application(s) running on the LCD controller 116 and hardwired into other components, e.g., the 16 bit microcontroller 120. Moreover, the components may include a backlight control 118 that enables the backlighting of the LCD The microcontroller 120 is coupled to a pressure sensor amplification and filtration circuit 122 described in greater detail herein in connection with FIG. 2C; however, it should be understood that the microcontroller 120 cooperates with and controls operation of the circuit 122 to trigger training and testing of a user for compression-only cardiac resuscitation on the mannequin. Likewise, data received from the pressure sensor circuit 122 may be transmitted via the RF antenna 124 (which may be, for example, a ZigBee® RF antenna or other RF antenna component) to the central CPU 108 via the RF antenna 106, both being illustrated in FIG. 1.

The mannequin 102a-c may also include an audio source 126 such as a buzzer and/or a Light Emitting Diode (LED) 128 located such that the operation of the LED and/or buzzer may be used as a cue to a user to perform compressions at a prescribed rhythm (dictated by the turning on and off of the LED and/or buzzer) and/or a cue to begin and/or end compressions during a training or testing session.

Each of the components included in the mannequin 102a-c that require electrical power for operation may be powered via a battery pack 130 and/or external AC power supply 134. Further, electrical power for operation may be controlled by an on/off switch 132.

Figure 2B:
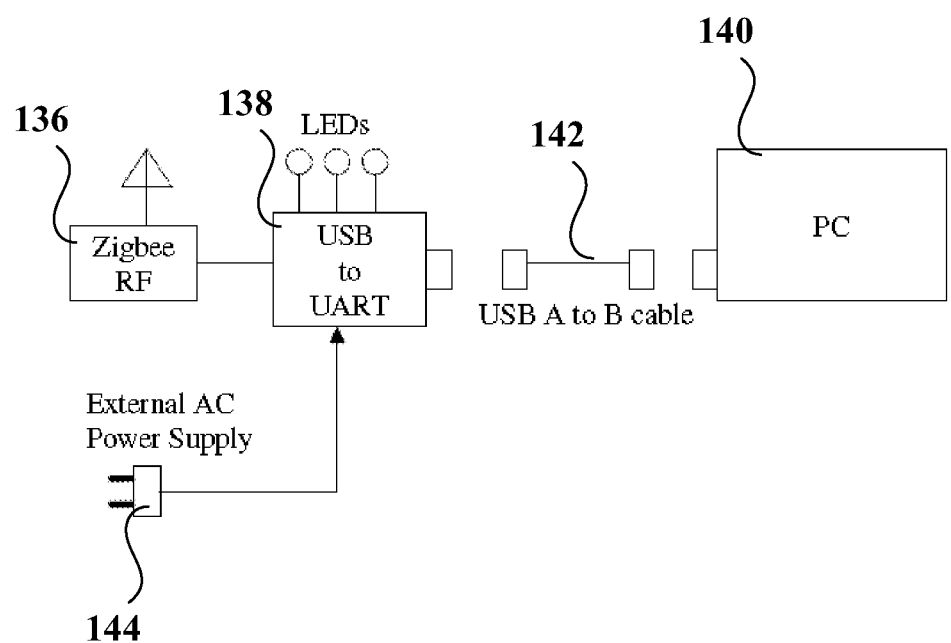
FIG. 2B illustrates an example of functional modules of the hardware and software components provided in association with at least one Central Processing Unit (CPU) utilized to collect, analyze and store data received from the plurality of mannequins illustrated in FIG. 1.

FIG. 2B illustrates an example of functional modules of the hardware and software components provided in association with at least one CPU utilized to collect, analyze and store data received from the plurality of mannequins illustrated in FIG. 1. As shown in FIG. 2B, data transmitted wirelessly from the mannequins 102a-c, may be received via the RF antenna 136 (which may be, for example, a ZigBee® RF antenna or other RF antenna component). That RF antenna 136 is coupled to a USB to Universal Asynchronous Receiver/Transmitter (UART) converter 138 (which may be included in the RF-USB adapter 106) that includes a plurality of LEDs configured to indicate operation and/or receipt and transmission of data from the RF antenna 136. The USB to UART converter 138 is coupled to a USB cable 142 that is, in turn coupled to Personal Computer (PC) 140 (which may be used to implement the central CPU 108 and display 110 illustrated in FIG. 1).

Each of the components illustrated in FIG. 2B that require electrical power for operation may be powered via an external AC power supply 144.

Various devices have been proposed to train users in applying the chest compressions associated with CPR. For example, U.S. Pat. No. 6,125,299 discloses a device that uses a force sensor to measure the compression force applied to a patient's chest. Likewise, U.S. Pat. No. 5,496,257 discloses a device that uses a pressure sensor to monitor compression forces and timing. However, these devices merely measure the force applied to the chest and do not measure the actual depth of compressions.

Nevertheless, measuring only force provides insufficient feedback to the user to determine whether chest compressions are being performed properly. Conventionally, there are various CPR training devices that use accelerometers to measure depth of compressions including U.S. Pat. Nos. 6,390,996 and 6,827,695. However, such devices and systems that use only accelerometers do not accurately measure compression depth.

Moreover, besides accelerometers' susceptibility to error in measuring compression depth, another particular problem with the use of accelerometers is the cost of such accelerometers. Use of an accelerometer in each mannequin included in a CPR training system can greatly increase the cost of the overall system and greatly decrease the number of mannequins likely to be purchased for use in the system. As a result, the number of individuals trained using such systems is greatly decreased, thereby reducing the effectiveness of the trainings and testing system.

Accordingly, at least one disclosed embodiment provides a unique component configuration and method that may be used to determine the rate, depth and recoil associated with a user's chest compressions performed on a training mannequin. This embodiment includes a relatively low cost component structure within the mannequin that comprises two magnets with opposing magnetic fields facing each other and a Hall Effect sensor positioned between the magnets. An example of this structure is illustrated in FIG. 2C.

Figure 2C:
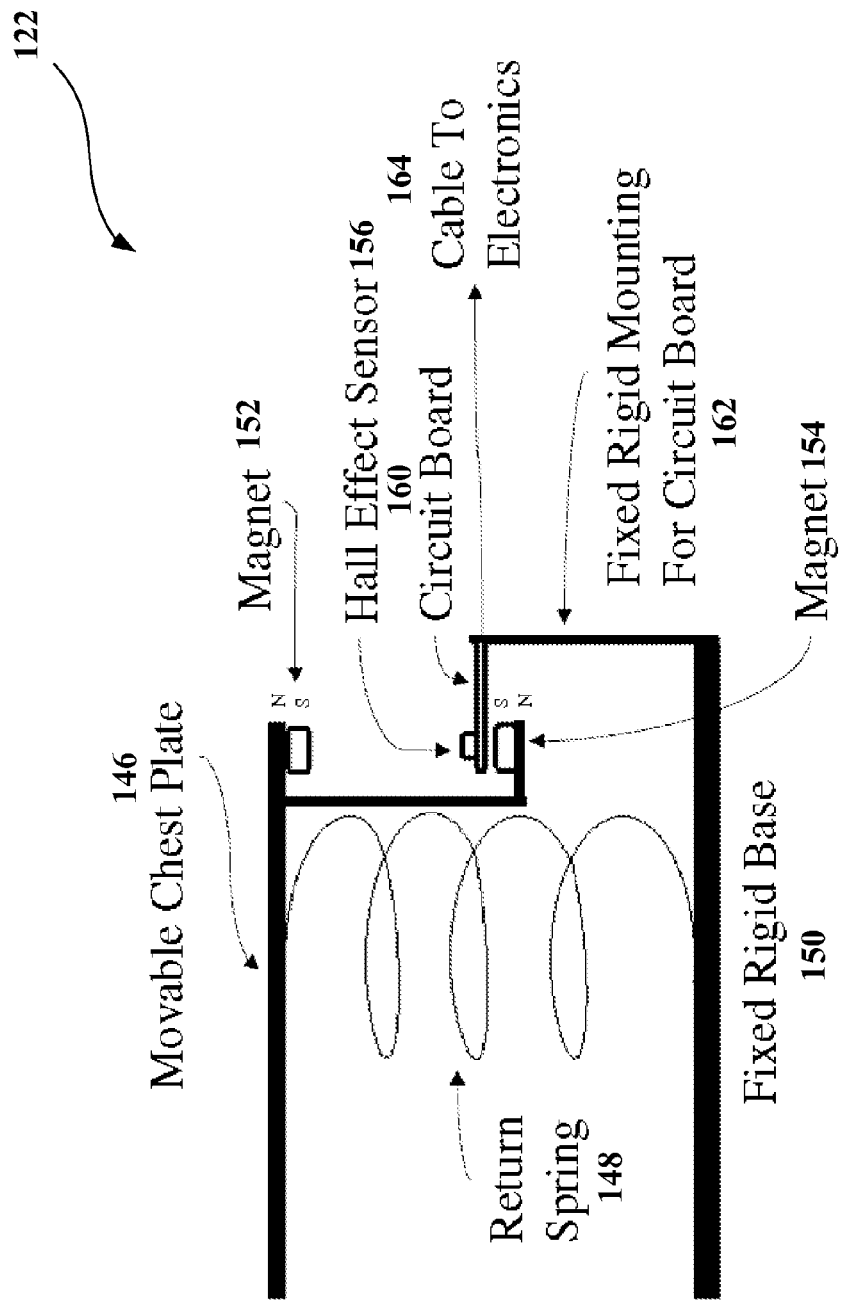
FIG. 2C illustrates an example of the hardware components provided in association with the pressure sensor illustrated in FIG. 2A utilized to collect the data associated with rate, depth and recoil of compressions performed by a user on a mannequin, as illustrated in FIG. 1.

More specifically, FIG. 2C illustrates an example of the hardware components provided in association with the pressure sensor 122 illustrated in FIG. 2A and utilized to collect the data associated with rate, depth and recoil of compressions performed by a user on a mannequin, as illustrated in FIG. 1.

Pressure sensor 122 is coupled to a circuit board 160 that includes the necessary electronic components to enable operation of the sensor 156 and transmit sensed data to various other pieces of electronics within the mannequins 102a-c (as illustrated in FIG. 2A) via a cable 164.

As shown in FIG. 2C, the magnet 152 is positioned to have its magnetic field oppose that of the magnet 154, both magnets being positioned along a wall next to a return spring 148 provided in-between a movable chest plate 146 and a fixed rigid base of the mannequins 102a-c (illustrated in FIG. 1). As a user performs compressions to force the movable chest plate 146 downward towards the fixed rigid base 150, a Hall Effect sensor 156 detects the change in the magnetic field around the sensor 156; as a result, the sensor 156 detects the relative movement of the movable chest plate 146 because the magnets 152, 154 move in relationship to the hall Effect sensor 156 as the chest plate 146 is compressed towards the rigid base 150. Thus, although the Hall Effect sensor 156 is held fixed in position by a fixed rigid mounting for the circuit board 162 and sensor 156, the magnets 142, 154 move in relation to the Hall Effect sensor each time the mannequin's chest wall is compressed. Following that compression, the force imparted by the return spring 148, repositions the movable chest plate 146 to its non-compressed position.

As a result of the opposing forces of the return spring 148 and the force applied by a user performing chest compressions, the position of the Hall Effect sensor 156 enables the collection of data indicating the position of the magnets over a period of time, which in turn enables software to calculate the rate of compression and associated depth of compression and degree of recoil permitted by the user's compressions. Moreover, because of the relatively low cost of the Hall Effect sensor 156 and associated electronic components, the cost per mannequin to provide these features is significantly less than conventional configurations which use accelerometers. Moreover, this Hall Effect sensor implementation does not suffer from susceptibility to the same sources of error.

It should be understood that this improved mechanism for obtaining rate, depth and recoil data for chest compressions is particularly useful for training and certification testing of users performing chest compressions, whether they be for chest-compression-only resuscitation or conventional CPR. Therefore, use of this improved mechanism in association with various training and testing methodologies implemented via software algorithms is also of particular utility.

Figure 3:
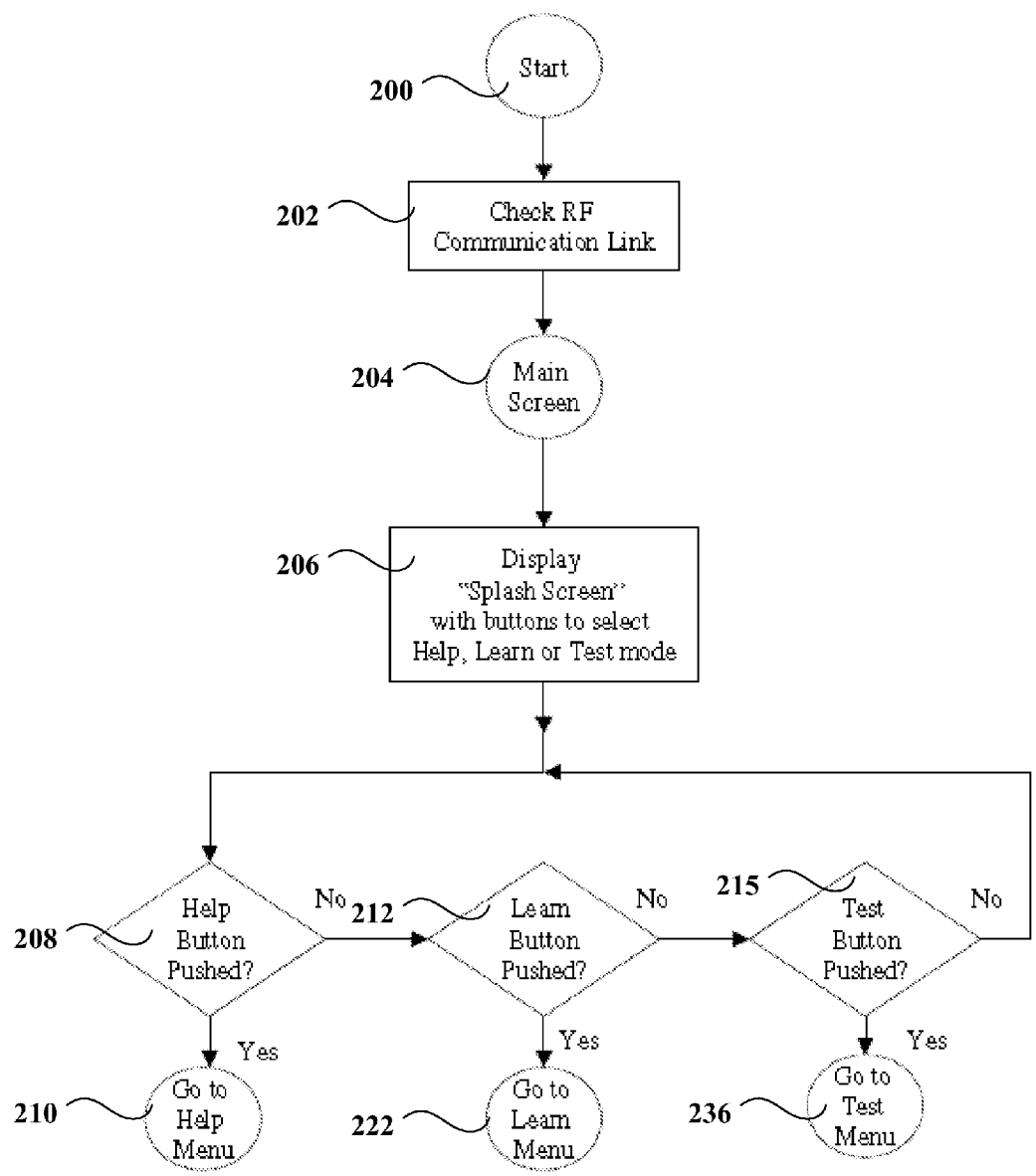
FIG. 3 illustrates one example of a first subroutine performed via software running on a mannequin unit and performing a "Startup" routine.

FIG. 3 illustrates one example of a first subroutine performed via software running on a mannequin unit (such as the mannequins 102a-c illustrated in FIG. 1) and performing a Startup routine. As shown in FIG. 3, operations begin at 200 and control proceeds to 202, at which an RF communication link is checked to establish or confirm establishment of a wireless communication link with the central CPU (see, for example, 108 illustrated in FIG. 1). Control then proceeds to 204, at which a main system screen is displayed and control proceeds to 206 at which a "splash screen" is displayed that includes various buttons or icons that enable a user to select one of various options including "Help," "Learn" and "Test Mode."

Based on a received selection entered by a user (via for example, the touch screen that is being used to display the various icons, as discussed above), control proceeds to 208, at which point it is determined whether the "Help" button/icon has been selected or pushed. If it has, control proceeds to 210, at which the "Help" Menu is displayed based on operations illustrated in FIG. 4 and explained below. If it is determined that the "Help" button/icon has not been selected or pushed, control proceeds to 212 at which point it is determined whether the "Learn" button/icon has been selected or pushed. If it has, control proceeds to 222, at which the "Learn" Menu is displayed based on operations illustrated in FIG. 5 and explained below. If it is determined that the "Learn" button/icon has not been selected or pushed, control proceeds to 215 at which point it is determined whether the "Test" button/icon has been selected or pushed. If it has, control proceeds to 236, at which point the "Test" Menu is displayed based on operations illustrated in FIG. 6 and explained below. If it is determined that the "Test" button/icon has not been selected or pushed, control returns to 208; in this way the software continuously monitors for selection of one of the displayed options of "Help", "Learn" or "Test."

Figure 4:
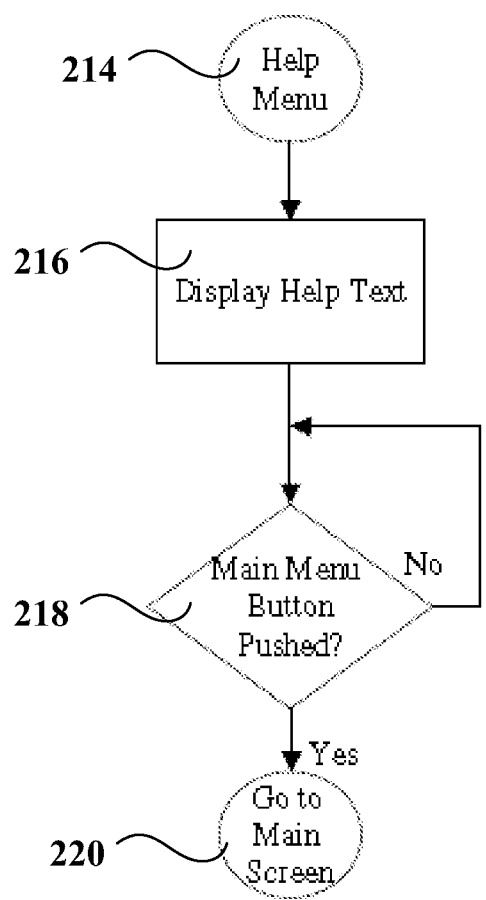
FIG. 4 illustrates one example of a second subroutine performed via software running on a mannequin unit and performing a "Help" Menu routine.

FIG. 4 illustrates one example of a second subroutine performed via software running on a mannequin unit (such as the mannequins 102a-c illustrated in FIG. 1) and performing a "Help" Menu routine. As shown in FIG. 4, operations begin at 214 and control proceeds to 216, at which point help text including various messages and content providing information about the system and its operation are displayed. Control then proceeds to 218 at which point it is determined whether a "Main" Menu icon/button has been selected or pushed. If so, control proceeds to 220 at which point a "Main" Menu screen is displayed based on operations illustrated in FIG. 3. If it is determined that the "Main" Menu icon/button has not been selected or pushed, control returns to 218 to provide continuous monitoring for selection of the "Main" Menu icon/button.

Figure 5:
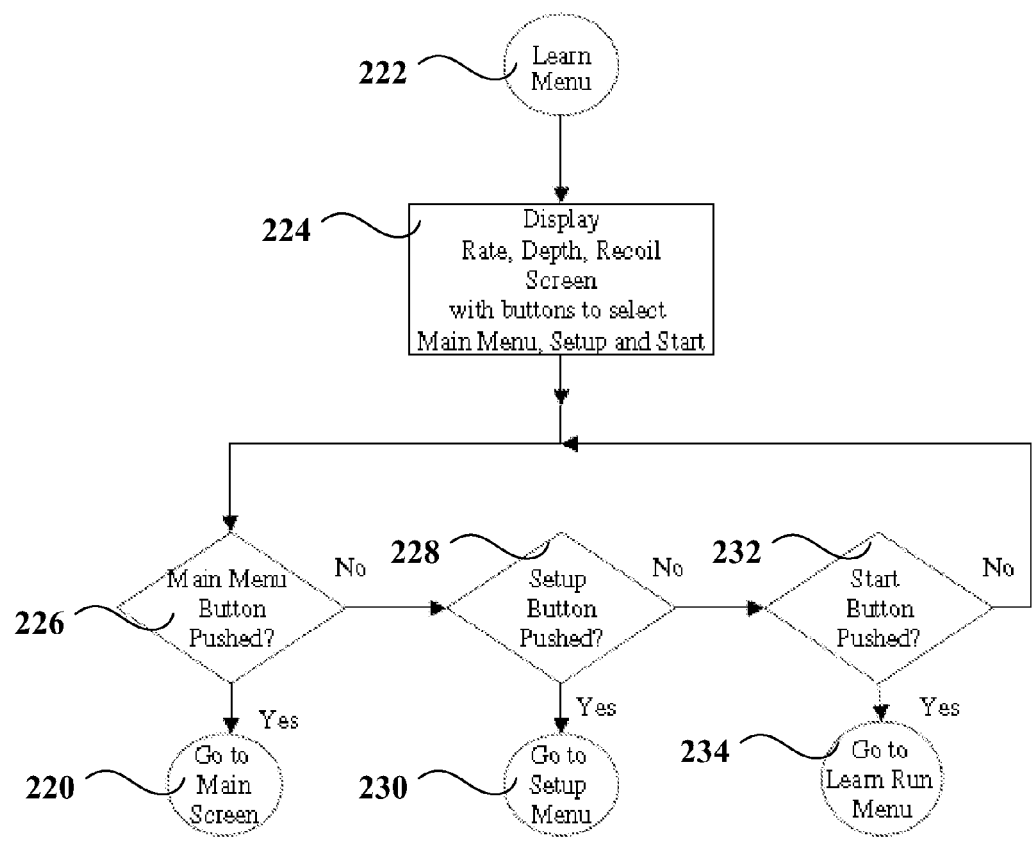
FIG. 5 illustrates one example of a third subroutine performed via software running on a mannequin unit and performing a "Learn" Menu routine.

FIG. 5 illustrates one example of a third subroutine performed via software running on a mannequin unit (such as the mannequins 102a-c illustrated in FIG. 1) and performing a "Learn" Menu routine. As shown in FIG. 5, operations begin at 222 and control proceeds to 224 at which point a screen displaying rate, depth, recoil bar graphs or other types of graphs are displayed along with buttons/icons for selection to trigger display of the "Main" Menu screen (see FIG. 3), the "Setup" screen (see FIG. 7) and the "Learn Run" screen (which triggers starting of the learning subroutine operations illustrated in FIG. 8 and discussed below).

Figure 6:
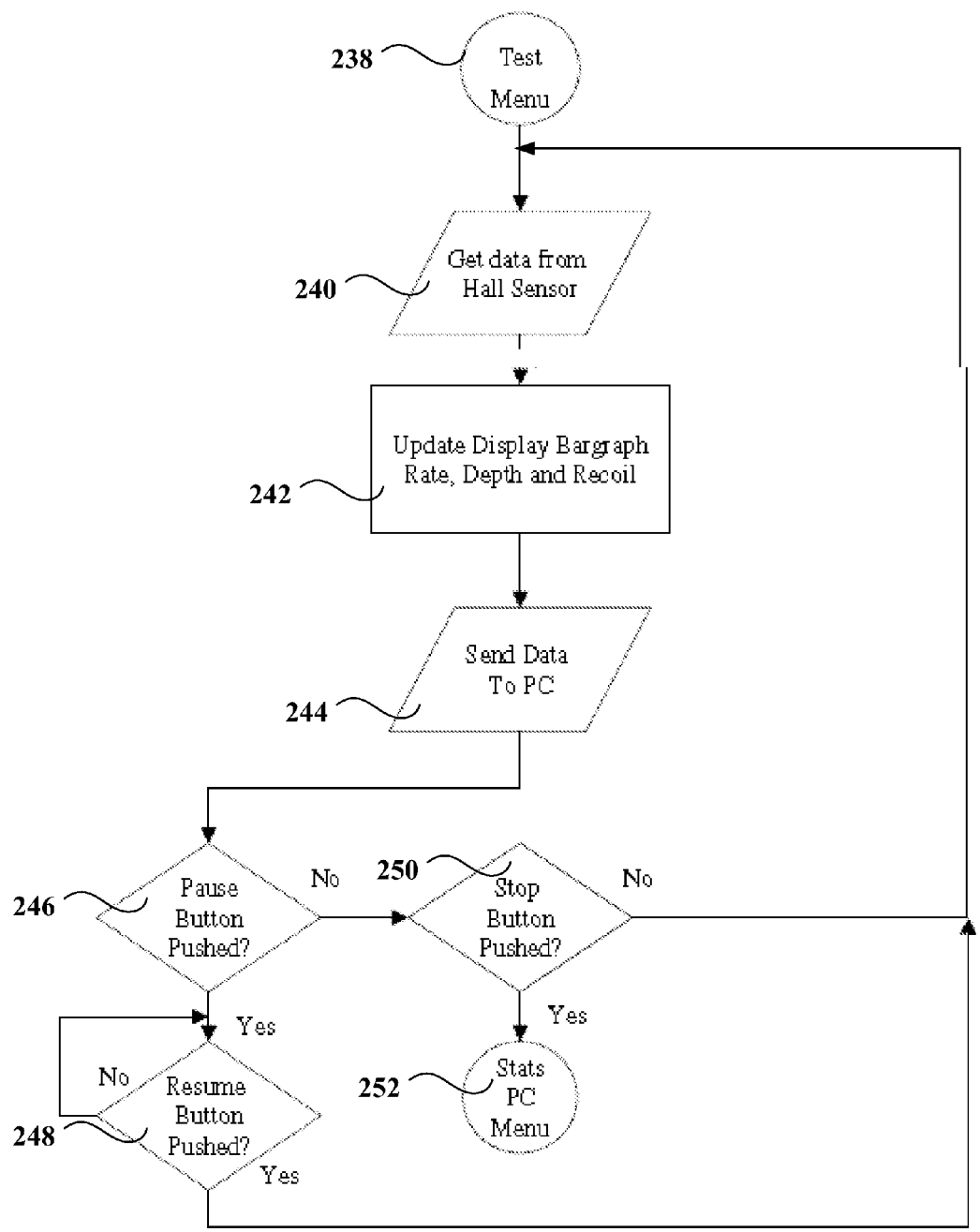
FIG. 6 illustrates one example of a fourth subroutine performed via software running on a mannequin unit and performing a "Test" Menu routine.

FIG. 6 illustrates one example of a fourth subroutine performed via software running on a mannequin unit (such as the mannequins 102a-c illustrated in FIG. 1) and performing a "Test" Menu routine. As shown in FIG. 6, operations begin at 238 and control proceeds to 240, at which point data is received from the Hall sensor circuit configuration illustrated in FIG. 2C. Control then proceeds to 242, at which point the bar graph (or other type of graph) displayed on the screen is updated to display the received rate, depth and recoil data. Control then proceeds to 244, at which time that data is transmitted to the central CPU (e.g., CPU 108 illustrated in FIG. 1 and optionally implemented using a PC such as PC 140 illustrated in FIG. 2B). Control then proceeds to 246, at which time it is detected whether a pause button/icon has been pushed or selected. Selection of a pause button by a user may be indicative of the user wanting to pause cardiac compression training. As a result, determining that the pause button has been selected triggers pausing of the training and control proceeds to 248, at which point the software monitors for selection of a "Resume" button/icon on an ongoing basis until it is detected; once the "Resume" button/icon is pushed/selected, control returns to 240 for continuous updating of the displayed test data.

Similarly, determining that the pause button has not been pushed at 246 triggers control to proceed to 250 at which point a determination is made whether a displayed "Stop" button/icon has been pushed/selected. If not, control returns to 240 for continuous updating of the displayed test data. If so, control proceeds to 252, at which point operations performed in the "Stats PC" Menu (illustrated in FIG. 9) are performed, as explained herein.

Figure 7:
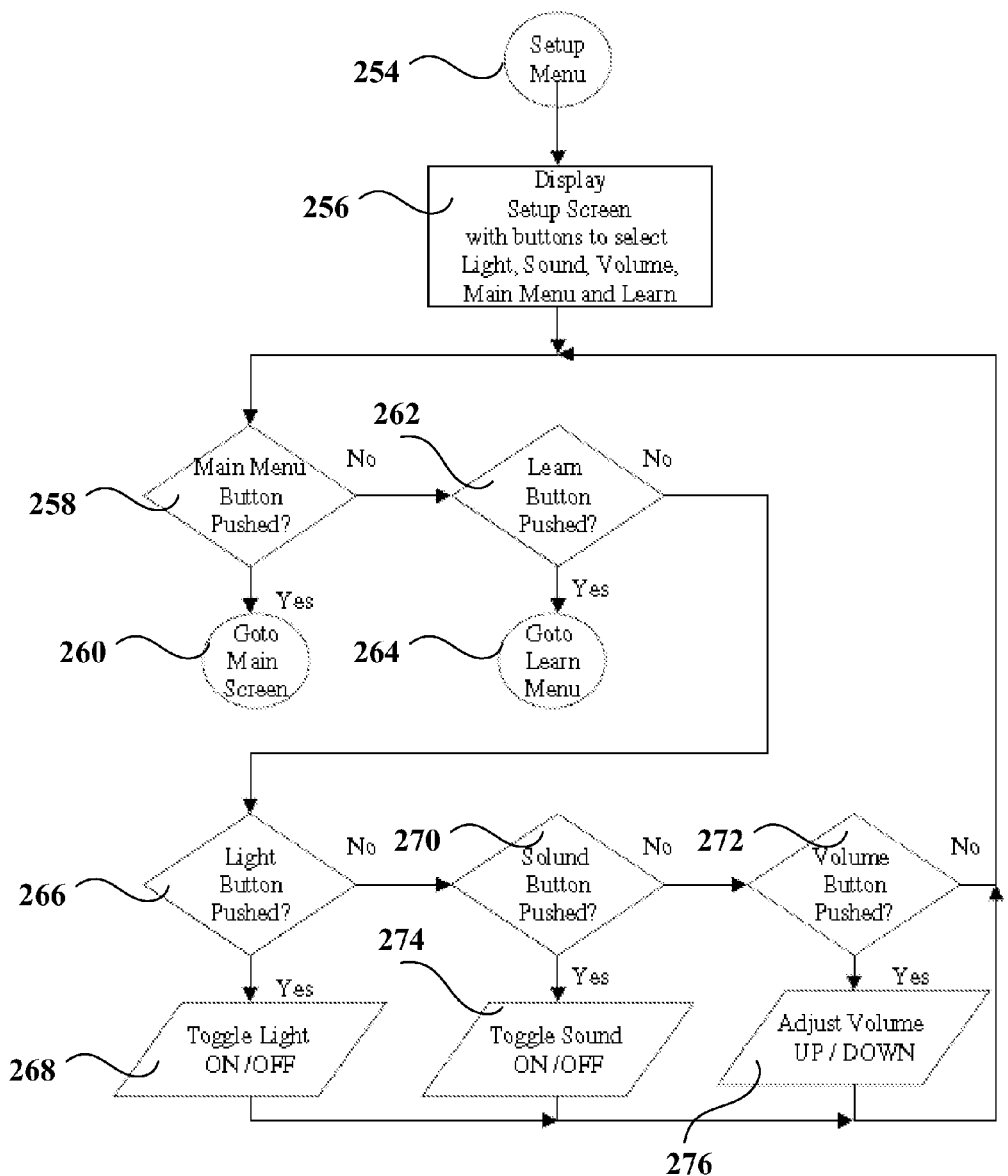
FIG. 7 illustrates one example of a fifth subroutine performed via software running on a mannequin unit and performing a "Setup" Menu routine.

FIG. 7 illustrates one example of a fifth subroutine performed via software running on a mannequin unit (such as the mannequins 102a-c illustrated in FIG. 1) and performing a "Setup" Menu routine. As shown in FIG. 7, operations begin at 254 and control proceeds to 256 at which point a setup screen is displayed with various buttons/icons for selecting and altering lighting and sound options, for example, volume. Additionally, various other buttons/icons are displayed including those associated with selection of the "Main" Menu and the "Learn" Menu, discussed above. Control then proceeds to 258, at which point it is determined whether the "Main" Menu button/icon has been selected or pushed. If it has, control proceeds to 260, at which point the "Main" Menu screen subroutine is initiated as illustrated in FIG. 3. If it is determined that the "Main" Menu button/icon has not been selected or pushed, control proceeds to 262 at which point it is determined whether the "Learn" button/icon has been selected or pushed. If it has, control proceeds to 264, at which point the "Learn" Menu is displayed based on operations illustrated in FIG. 5 and explained above.

If it is determined that the "Learn" button/icon has not been selected or pushed, control proceeds to 266, at which point a determination is made whether the "Light" button/icon has been selected or pushed. If it has, control proceeds to 268, at which point the backlight is toggled on/off and control returns to 256 for continuous monitoring of other selected button/icons. If it is determined that the "Light" button/icon has not been selected or pushed, control proceeds to 270, at which point a determination is made whether the "Sound" button/icon has been selected or pushed. If it has, control proceeds to 274, at which point the sound is toggled on/off to optionally effect a mute stage of operation and control returns to 256 for continuous monitoring of other selected button/icons.

If it is determined that the sound button/icon has not been selected or pushed, control proceeds to 272, at which point a determination is made whether a volume button/icon has been selected or pushed. If it has, control proceeds to 276, at which point a mechanism is displayed for adjusting volume of sounds emitted from the mannequin up or down. If it is determined that the volume button/icon has not been selected or pushed, control returns to 256 for continuous monitoring of other selected button/icons.

Figure 8:
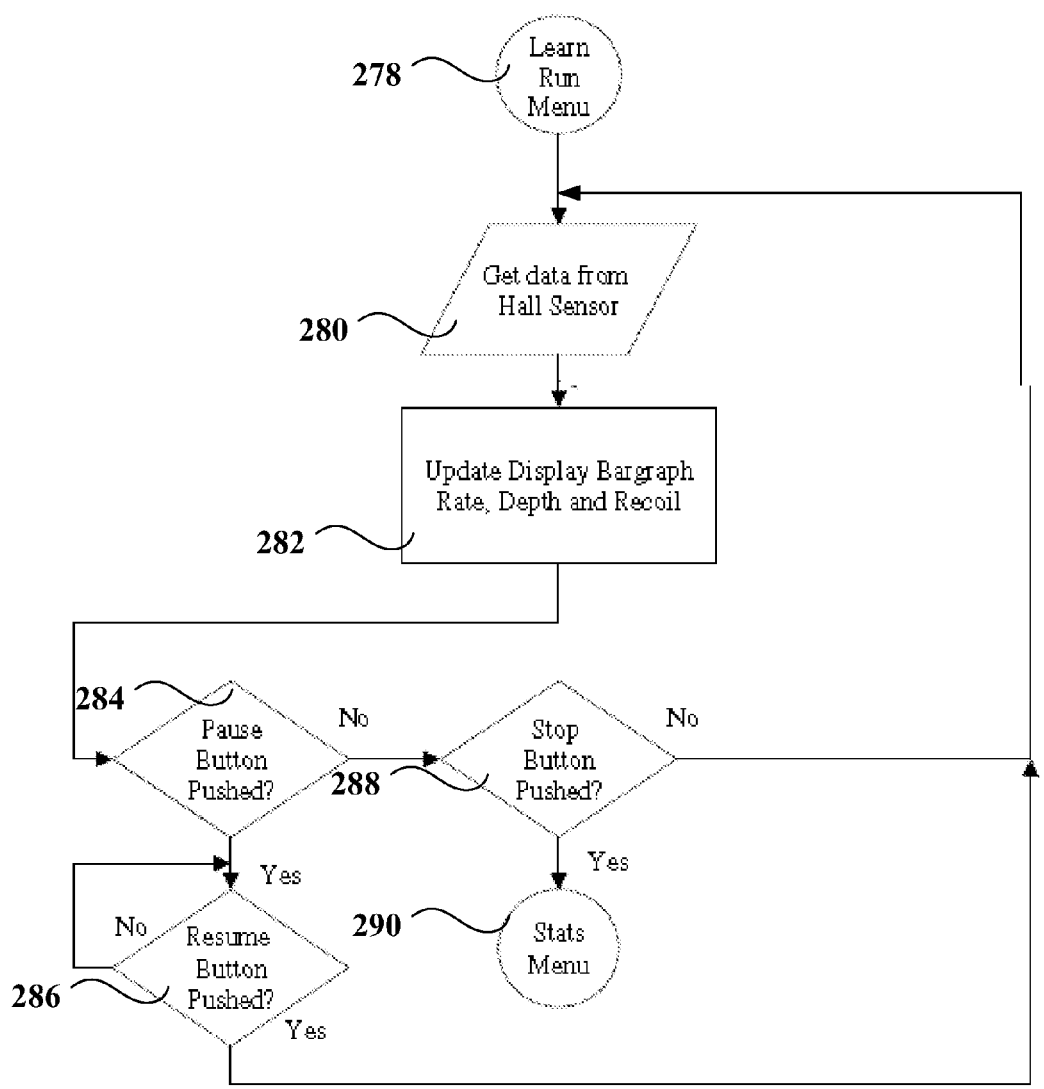
FIG. 8 illustrates one example of a sixth subroutine performed via software running on a mannequin unit and performing a "Learn Run" Menu routine.

FIG. 8 illustrates one example of a sixth subroutine performed via software running on a mannequin unit (such as the mannequins 102a-c illustrated in FIG. 1) and performing a "Learn Run" Menu routine. As illustrated in FIG. 8, operations begin at 278 and control proceeds to 280, at which point data is received from the Hall sensor circuit configuration illustrated in FIG. 2C. Control then proceeds to 282, at which point the bar graph (or other type of graph) displayed on the screen is updated to display the received rate, depth and recoil data. Control then proceeds to 284, at which time it is detected whether a "Pause" button/icon has been pushed or selected. Selection of a pause button by a user may be indicative of the user wanting to pause cardiac compression training. As a result, determining that the pause button has been selected triggers pausing of the training and control proceeds to 286, at which point the software monitors for selection of a "Resume" button/icon on an ongoing basis until it is detected; once the "Resume" button/icon is pushed/selected, control returns to 280 for continuous updating of the displayed test data.

Similarly, determining that the pause button has not been pushed at 284 triggers control to proceed to 288 at which point a determination is made whether a displayed "Stop" button/icon has been pushed/selected. If not, control returns to 280 for continuous updating of the displayed test data. If so, control proceeds to 290, at which point operations performed in the "Stats" Menu (illustrated in FIG. 9) are performed.

Figure 9:
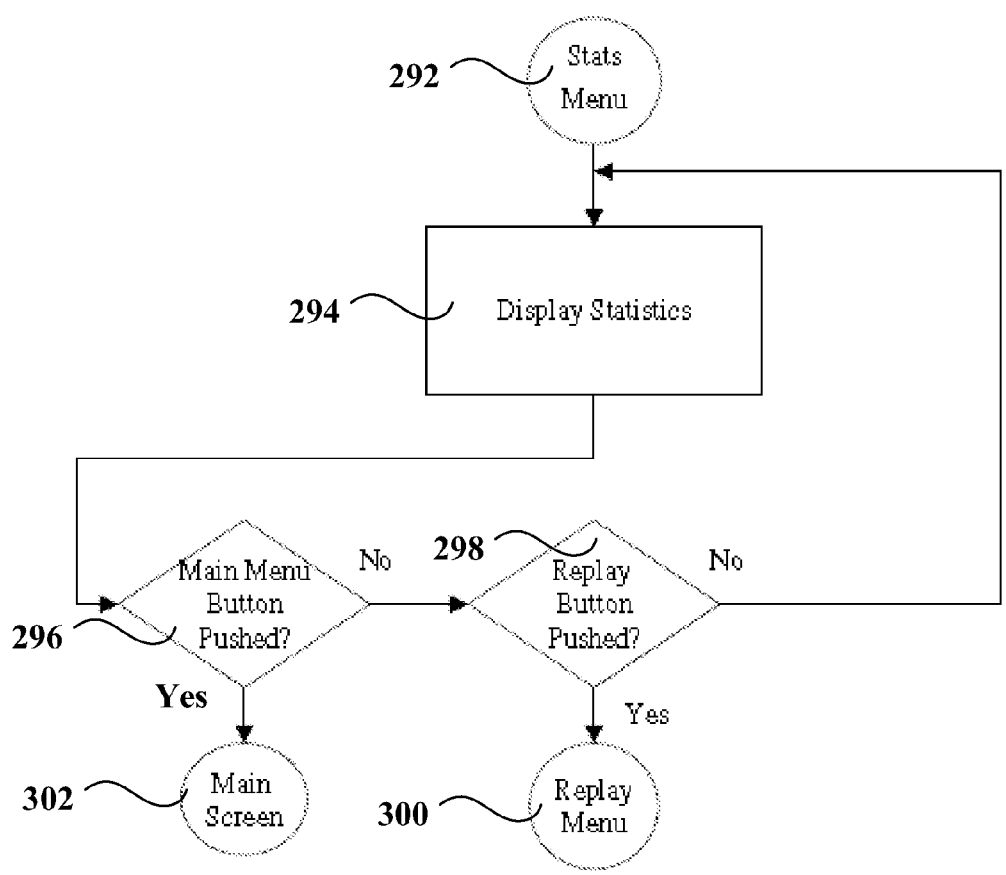
FIG. 9 illustrates one example of a seventh subroutine performed via software running on a mannequin unit and performing a "Stats" Menu routine.

Thus, FIG. 9 illustrates one example of a seventh subroutine performed via software running on a mannequin unit (such as the mannequins 102a-c illustrated in FIG. 1) and performing a "Stats" Menu routine. As illustrated in FIG. 9, operations begin at 292 and control proceeds to 294, at which point statistics regarding the user's performance of chest compressions are displayed on the touch screen. Control then proceeds to 296, at which point it is determined whether the "Main" Menu button/icon has been pressed/selected. If so, control proceeds to 302, at which point the "Main" Menu screen subroutine illustrated in FIG. 3 is performed. If not, control proceeds to 298, at which point it is determined whether a "Replay" button/icon has been pressed/selected to trigger re-display of previously displayed statistics. If so, control proceeds to 300, at which point operations are performed to perform that replay (as explained in conjunction with FIG. 10, discussed below). If not, control returns to 294.

Figure 10:
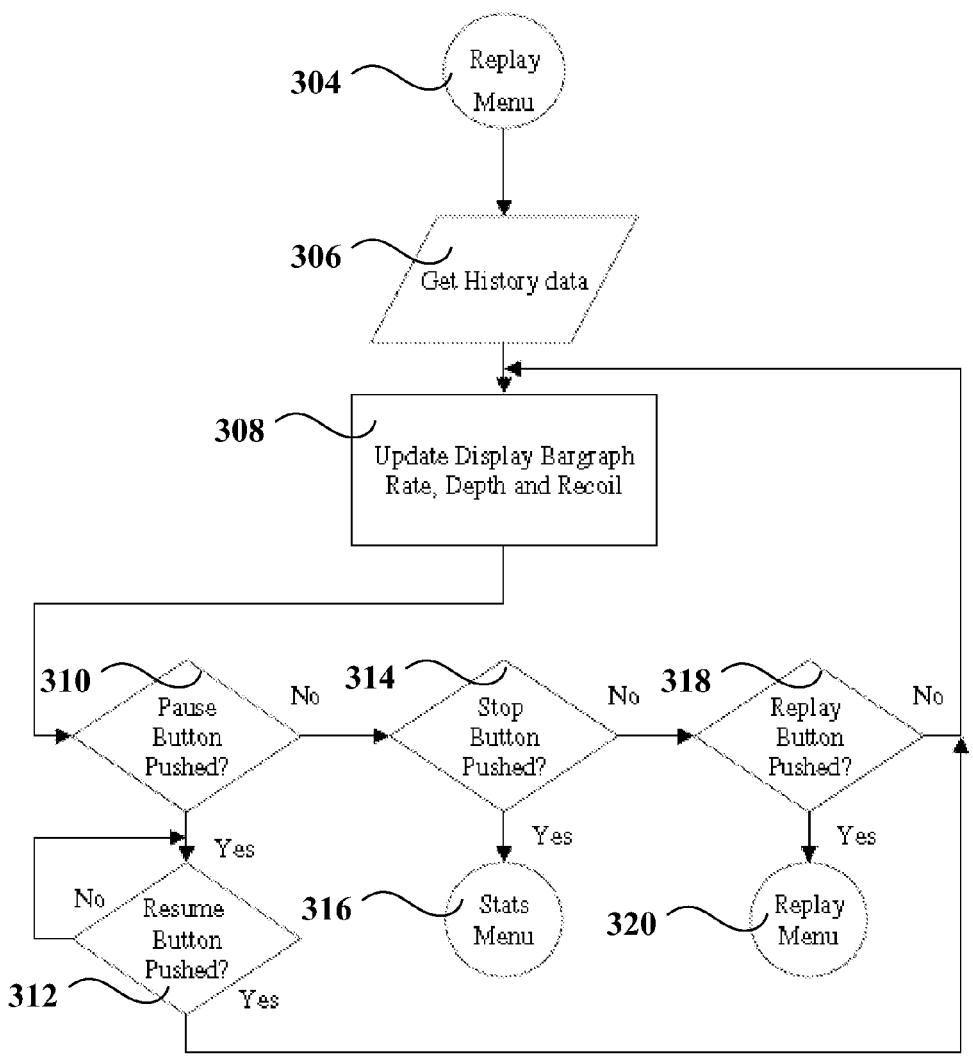
FIG. 10 illustrates one example of a seventh subroutine performed via software running on a mannequin unit and performing a "Replay" routine.

FIG. 10 illustrates one example of a seventh subroutine performed via software running on a mannequin unit (such as the mannequins 102a-c illustrated in FIG. 1) and performing a "Replay" routine. As illustrated in FIG. 10, operations begin at 306, at which point historical test and/or training data is obtained from, for example, an on-mannequin memory module (not shown). Control then proceeds to 308 at which point the obtained historical data is used to update the displayed bar graph illustrating rate, depth and recoil data. Control then proceeds to 310, at which time it is detected whether a "Pause" button/icon has been pushed or selected. Selection of a pause button by a user may be indicative of the user wanting to pause cardiac compression training. As a result, determining that the pause button has been selected triggers pausing of the training and control proceeds to 312, at which point the software monitors for selection of a "Resume" button/icon on an ongoing basis until it is detected; once the "Resume" button/icon is pushed/selected, control returns to 308 for continuous display of the historical data.

Similarly, determining that the pause button has not been pushed at 310 triggers control to proceed to 314 at which point a determination is made whether a displayed "Stop" button/icon has been pushed/selected. If not, control proceeds to 318, at which point it is determined whether the "Replay" button/icon has again been pushed/selected. If so, control returns to 304. If not, control returns to 308.

Figure 11:
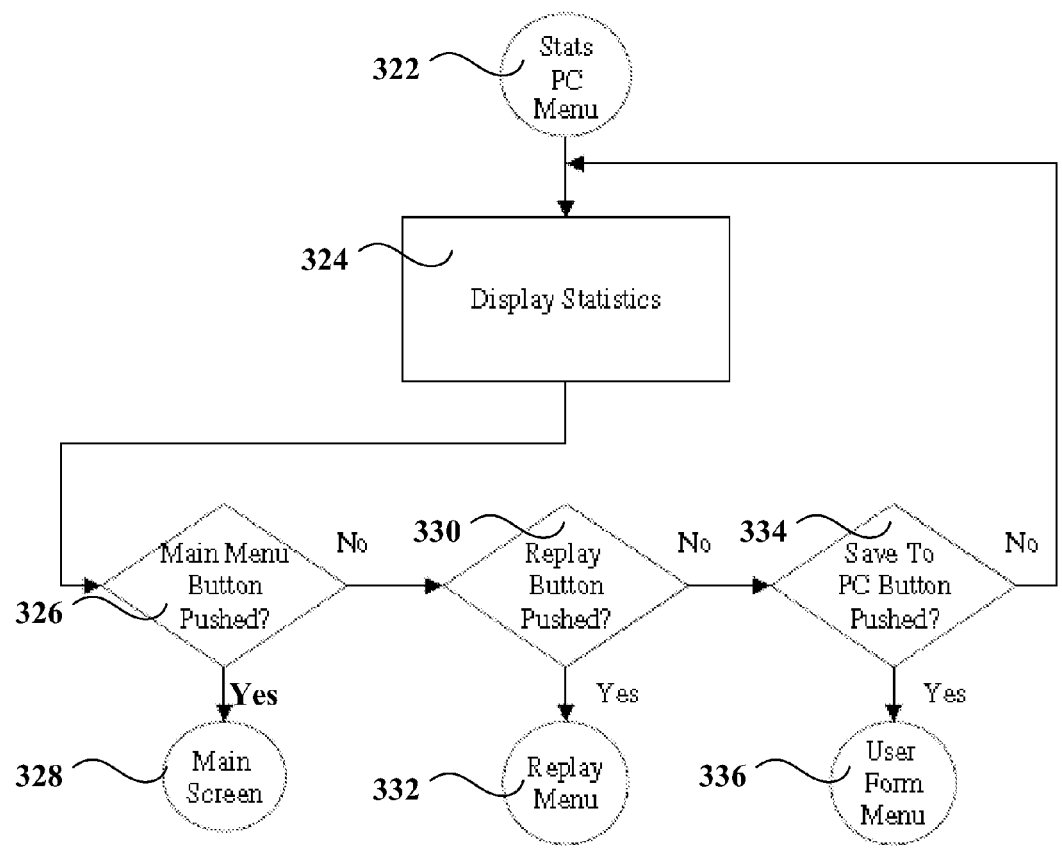
FIG. 11 illustrates one example of an eighth subroutine performed via software running on a mannequin unit and performing a "Stats PC" Menu routine.

FIG. 11 illustrates one example of an eighth subroutine performed via software running on a mannequin unit (such as the mannequins 102a-c illustrated in FIG. 1) and performing a "Stats PC" Menu routine. Note, operations performed in this subroutine are triggered, for example, by a user selecting the "Stop" button during the "Test" Menu subroutine illustrated in FIG. 6. As shown in FIG. 11, operations begin at 322 and control proceeds to 324 at which point statistics are displayed on a display (e.g., display 110 illustrated in FIG. 1 and implemented, for example, in the PC 140 illustrated in FIG. 11) formulated based on data received from at least one of a plurality of mannequin units that may be wirelessly communicating with the CPU.

Control then proceeds to 326, at which point it is determined whether a "Main" Menu button/icon has been pressed/selected. If so, control proceeds to 328, at which point the "Main" Menu screen subroutine illustrated in FIG. 3 is performed. If not, control proceeds to 330, at which point it is determined whether a "Replay" button/icon has been pressed/selected to trigger re-display of previously displayed statistics. If so, control proceeds to 332, at which point operations are performed to perform that replay (as explained in conjunction with FIG. 10, discussed above). If not, control proceeds to 334 at which point it is determined whether a "Save to PC" button/icon has been selected/pushed. If so, control proceeds to 336 to trigger performance of a "User Form" routine illustrated in FIG. 12. If not, control returns to 324 for continuous monitoring of selected buttons/icons as explained above.

Figure 12:
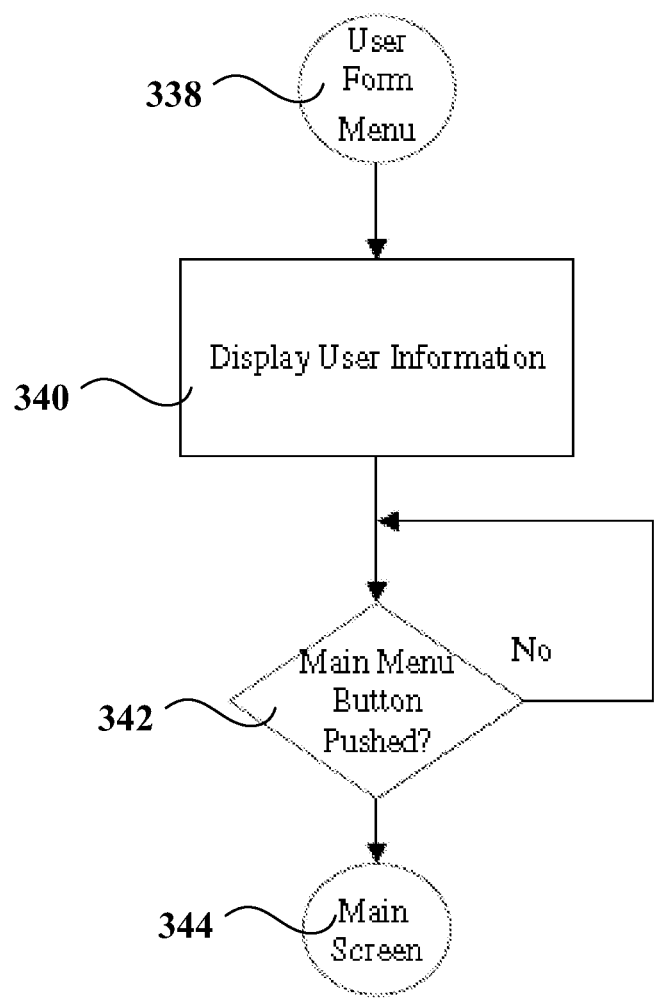
FIG. 12 illustrates one example of a ninth subroutine performed via software running on a mannequin unit and performing a "User Form" Menu routine.

FIG. 12 illustrates one example of a ninth subroutine performed via software running on a mannequin (such as the mannequins 102a-c illustrated in FIG. 1) and performing a "User Form" Menu routine. The "User Form" Menu routine enables users of a particular mannequin to review and optionally input previously registered information about themselves to enable identification, tracking and storage of cardiac compression testing and/or training data. As shown in FIG. 12, operations begin at 338 and control proceeds to 340, at which point user information is displayed via the touch screen (and optionally, correction or input of user data is provided as an option). Control then proceeds to 342, at which time it is determined whether the "Main" Menu button/icon has been pressed/selected; if so, control proceeds to 344, at which point the "Main" Menu sequence is initiated (see FIG. 3, discussed above); if not, control returns to 342 to continuously monitor for selection of the "Main" Menu button/icon.

Figure 13:
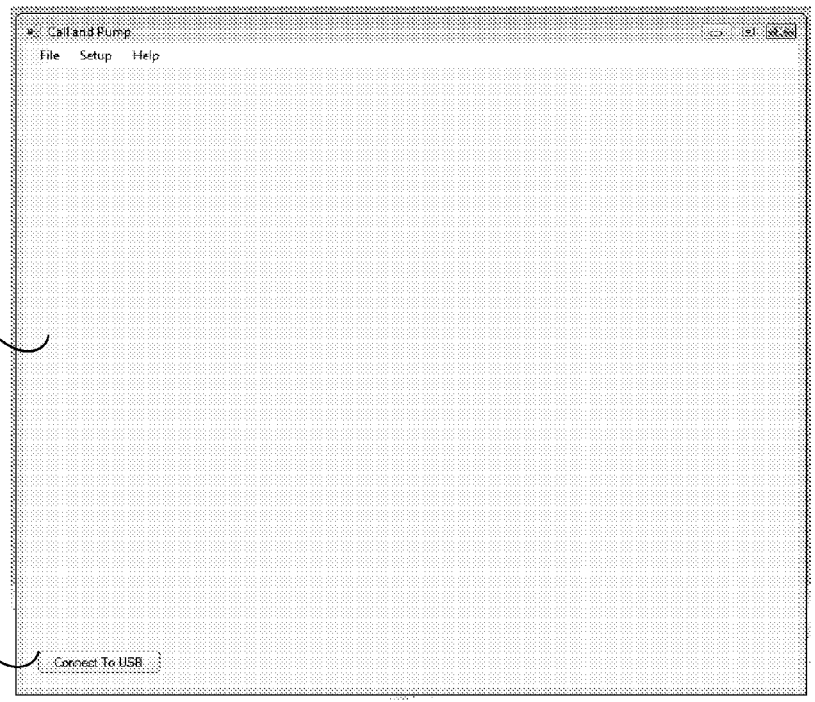
FIG. 13 illustrates an example of a system startup screen displayed in accordance with one implementation of software running on a central CPU coupled to communicate with each of a plurality of mannequin units.

FIG. 13 illustrates an example of a system startup screen displayed in accordance with one implementation of software running on a central CPU coupled to communicate with each of a plurality of mannequin units. Note, in FIG. 13, the user has the option to select a "Connect to USB" icon that would trigger a set of options and/or operations for connecting the central CPU to the USB ported RF antenna, illustrated in FIG. 1.

Figure 14:
FIG. 14 illustrates a second system startup screen in accordance with one implementation of software running a central CPU coupled to communicate with each of a plurality of mannequin units.
Figure 15:
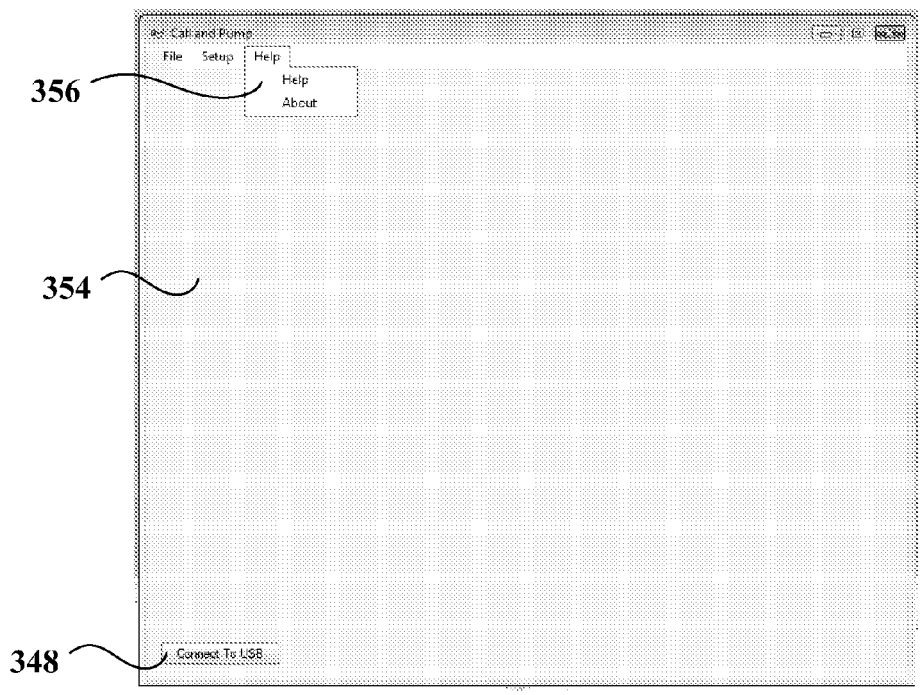
FIG. 15 illustrates a third system startup screen in accordance with one implementation of software running a central CPU coupled to communicate with each of a plurality of mannequin units.

FIG. 14 illustrates a second example 354 of the system startup screen displayed in accordance with one implementation of software running on a central CPU coupled to communicate with each of a plurality of mannequin units. Note, as shown in FIG. 14, from the File drop down menu 352, the software enables a user of the central CPU to print a form for a particular user or set of users, save data or various selections or exit the program. Likewise, as illustrated in FIG. 15, from the "Help" drop down menu 356, the user has the option of selecting the "About" option to obtain additional information about the software (thereby triggering the splash screen 418 illustrated in FIG. 25) or obtaining assistance in utilizing the software by selecting the "Help" Option. FIG. 15 illustrates a third system startup screen in accordance with one implementation of software running a central CPU coupled to communicate with each of a plurality of mannequin units.

Figure 16:
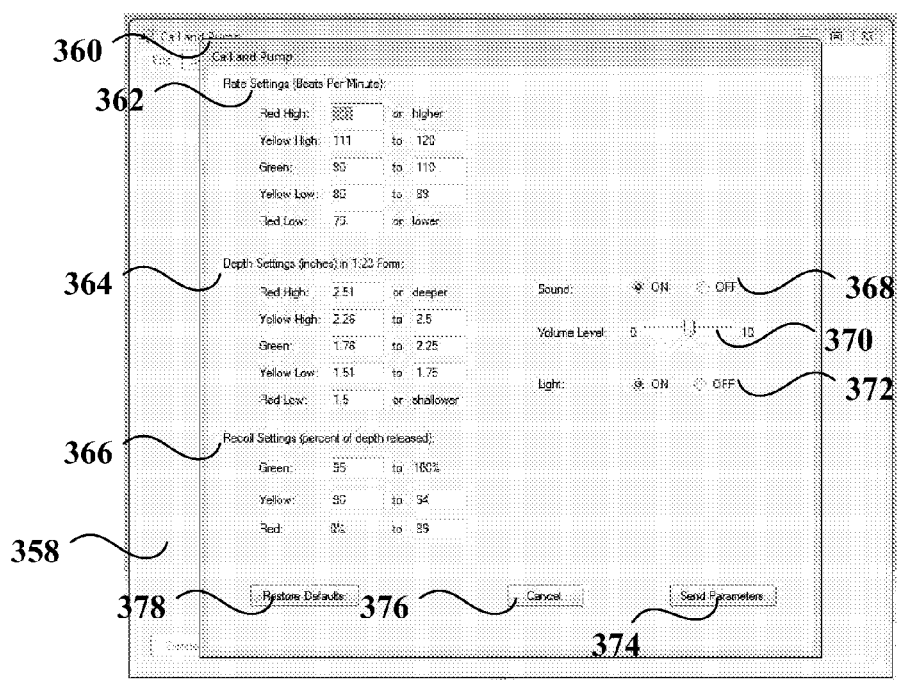
FIG. 16 illustrates an example of a system setup screen in accordance with one implementation of software running a central CPU coupled to communicate with each of a plurality of mannequin units.

FIG. 16 illustrates a third example 358 of a system setup screen displayed in accordance with one implementation of software running on a central CPU coupled to communicate with each of a plurality of mannequin units. As shown in FIG. 16, by selecting the "Setup" drop down menu, the user can trigger display of a Setup Graphical User Interface (GUI) 360 that enables a user to alter the specific parameters associated with color coded performance indicators; more specifically, users may set or alter the rate settings parameters 362, the depth settings parameters 364 and the recoil settings parameters 366.

It should be further appreciated that the settings may be set to indicate ranges of performance data associated with better or worse performance. For example, ranges may be set and associated with various colors, e.g., green, yellow and red, or symbols indicating, respectively, best range, middle range, and worst range. It should be appreciated that ranges may be set to indicate red when a user is performing compression far too slow and also, far too fast.

Additionally, the user can control whether the system (as a whole or in part at the CPU), will utilize sound 368, alter the volume of such sound 370 and utilize light 370 indicators for, e.g., triggering cardiac compressions by tested or trained individuals. Once those parameters have been entered, the user can send the parameters to the mannequin units by selecting the "Send Parameters" icon/button 374, cancel changes previous entered but not sent to the units by selecting the "Cancel" icon/button 376 or restore system defaults pre-programmed in the system by selecting the "Restore Defaults" button/icon 378.

Figure 17:
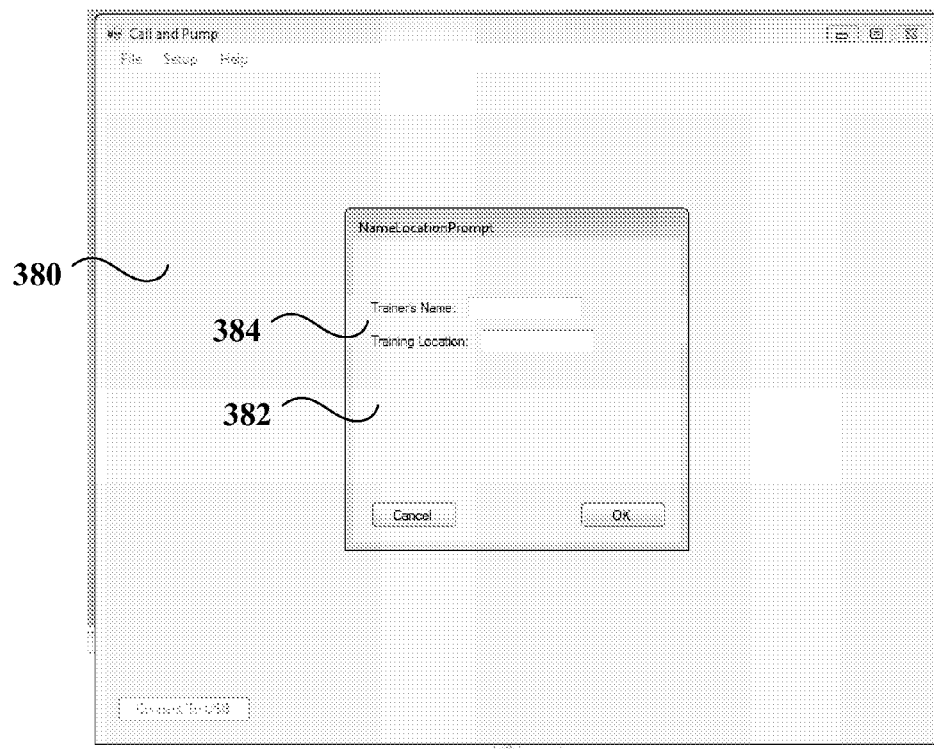
FIG. 17 illustrates an example of a user setup screen in accordance with one implementation of software running a central CPU coupled to communicate with each of a plurality of mannequin units.

FIG. 17 illustrates an example 380 of a user setup screen in accordance with one implementation of software running on the central CPU coupled to communicate with each of a plurality of mannequin units. As noted in FIG. 17, the setup screen includes the option of entering a trainer/educator/system administrator's name at field 384 and a training location at field 382. With this information, all data collected for a specified, and perhaps indefinite period of time may be associated with that data until the data is updated; alternatively, such fields may require population each time the system is initially setup.

Figure 18:
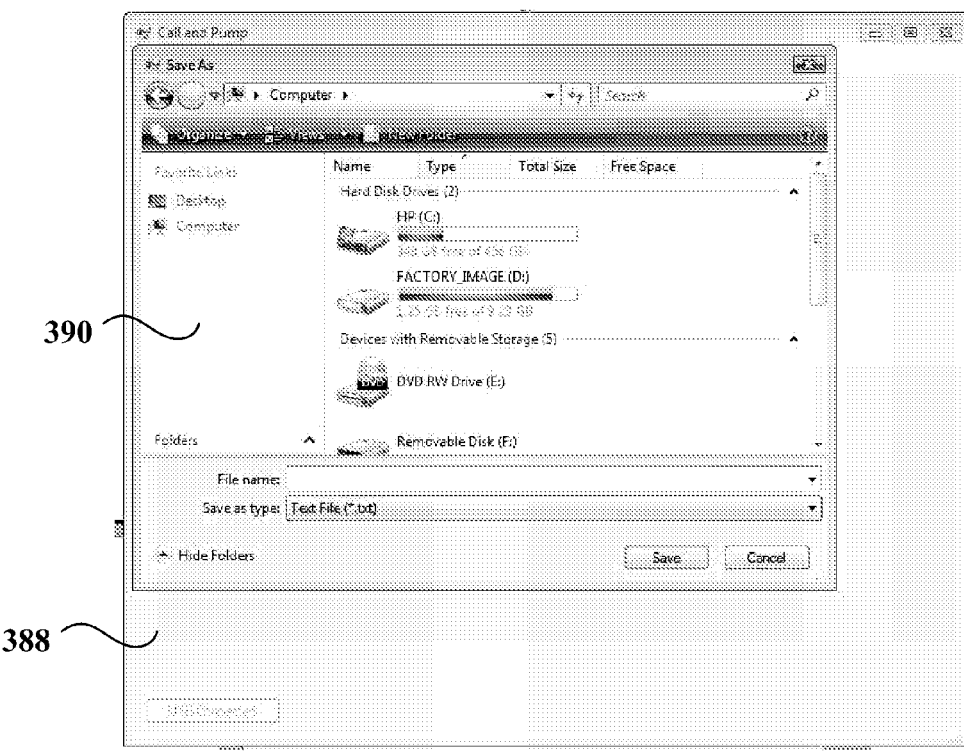
FIG. 18 illustrates an example of a data/file save screen in accordance with one implementation of software running a central CPU coupled to communicate with each of a plurality of mannequin units.
Figure 19:
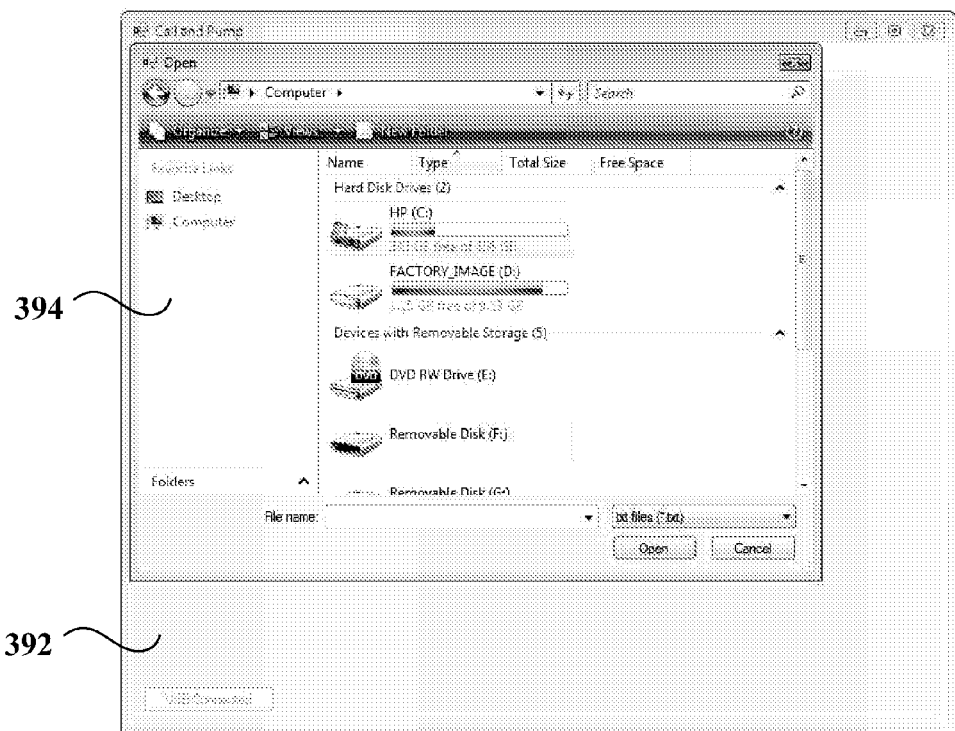
FIG. 19 illustrates an example of a data/file open screen in accordance with one implementation of software running a central CPU coupled to communicate with each of a plurality of mannequin units.

FIG. 18 illustrates an example 388 of a data/file save screen provided in accordance with one implementation of software running a central CPU coupled to communicate with each of a plurality of mannequin units. The "Save" function 390 may be used, for example, to save settings and/or trainee training and test data. Likewise, FIG. 19 illustrates an example 392 of a data/file open screen in accordance with one implementation of software running a central CPU coupled to communicate with each of a plurality of mannequin units. The "Open" function 394 enables users to be able to access previously saved settings and/or trainee data to enable continuing training or testing of saved but interrupted sessions.

Figure 20:
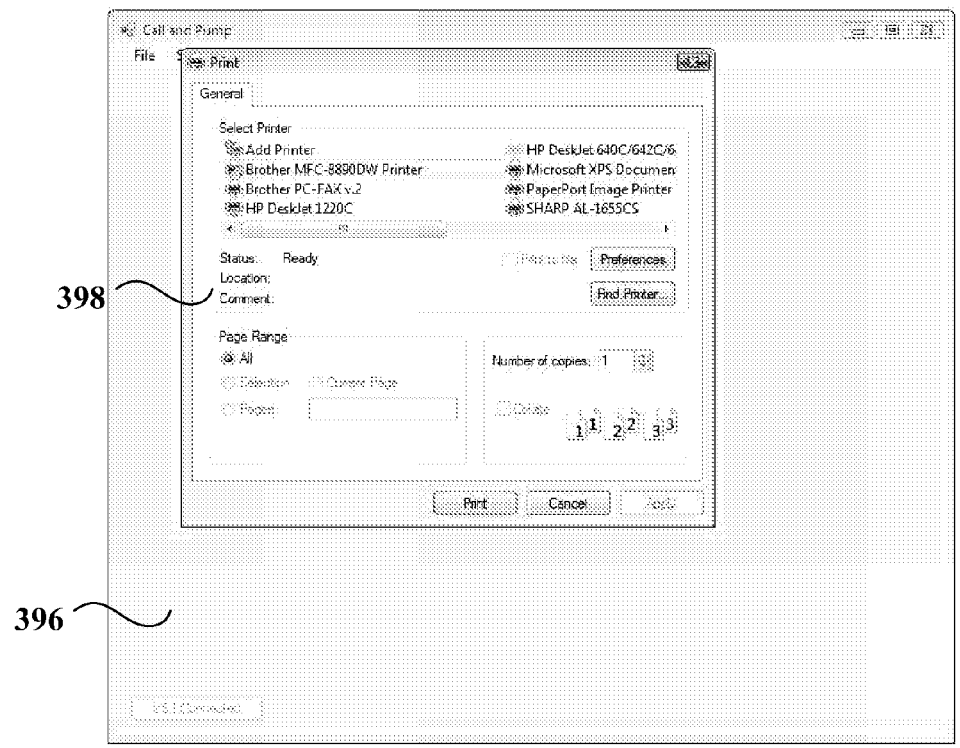
FIG. 20 illustrates an example of a data/file print screen in accordance with one implementation of software running a central CPU coupled to communicate with each of a plurality of mannequin units.

FIG. 20 illustrates an example 396 of a data/file print screen in accordance with one implementation of software running a central CPU coupled to communicate with each of a plurality of mannequin units. This "Print" function 398 enables hard copies of trainee and/or testing certification to be printed to an auxiliary device such as a printer (not shown).

Figure 21:
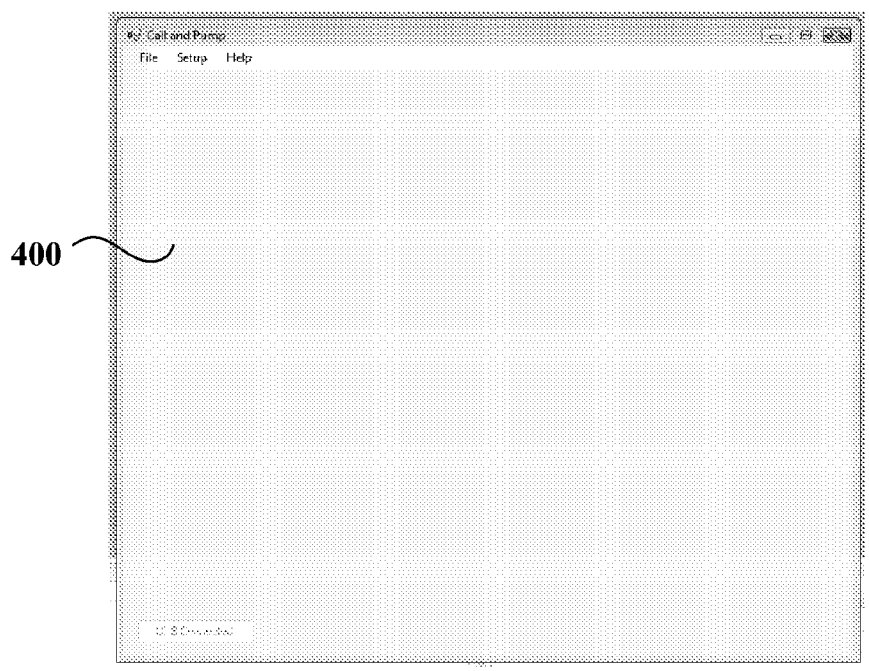
FIG. 21 illustrates an example of a system operation screen in accordance with one implementation of software running a central CPU coupled to communicate with each of a plurality of mannequin units but with no mannequins registered with the central CPU.

FIG. 21 illustrates an example of a system operation screen in accordance with one implementation of software running on the central CPU coupled to communicate with each of a plurality of mannequin units but with no mannequins registered with the central CPU.

Figure 22:
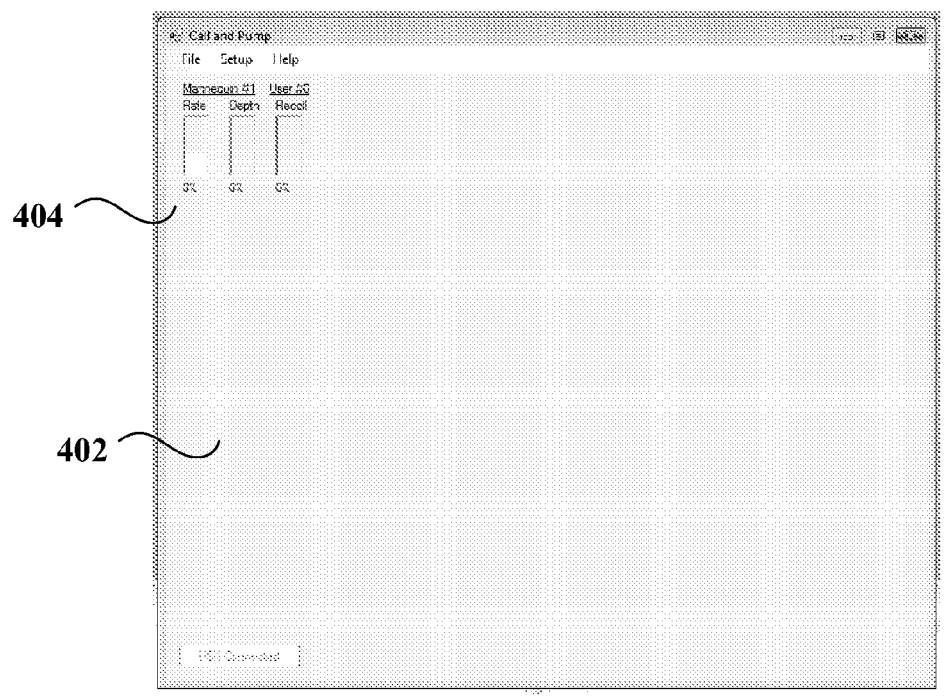
FIG. 22 illustrates another example of a system startup screen in accordance with one implementation of software running a central CPU coupled to communicate with each of a plurality of mannequin units and with a mannequin #1 registered with the central CPU.

FIG. 22 illustrates another example of a system startup screen in accordance with one implementation of software running on the central CPU coupled to communicate with each of a plurality of mannequin units, wherein no performance data has yet to be transmitted from mannequin #1.

Figure 23:
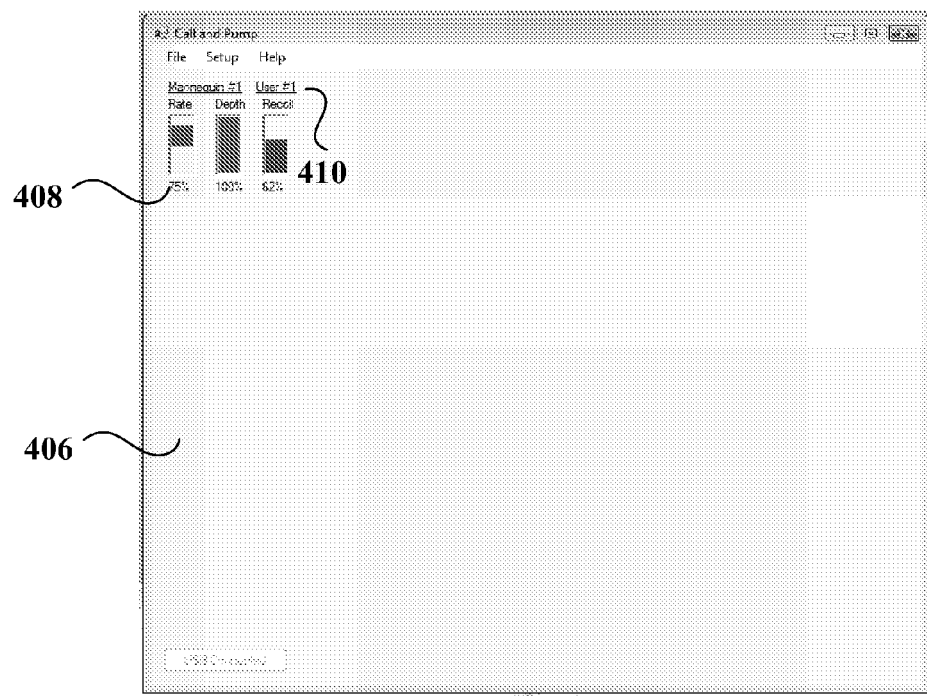
FIG. 23 illustrates an example of a training/testing screen in accordance with one implementation of software running a central CPU coupled to communicate with each of a plurality of mannequin units and with a mannequin #1 registered with the central CPU, wherein performance data has been received from the mannequin #1 and is displayed on the screen using a bar code format.

FIG. 23 illustrates an example of a training/testing screen in accordance with one implementation of software running on the central CPU coupled to communicate with each of a plurality of mannequin units and with a mannequin #1 registered with the central CPU, wherein performance data has been received from the mannequin #1 and is displayed on the screen using a bar code format.

Additionally, in FIG. 23, the performance data 408 includes within it an indication of the performance of the user of the mannequin #1. Additionally, the performance data indicates which user, here User #1, is performing compressions on that mannequin. By providing the capability of displaying the performance data 408 for each mannequin and also indicating which user is operating on that mannequin, the display provides improved manageability of the data for a training/testing administrator or instructor. Such improvements are particularly valuable when, for example, a larger plurality of mannequin units are communicating with the central CPU to display performance data. By listing the user's identification number (or other indicia, for example, name, organization, ranking, position, etc.), the instructor or training administrator is better able to process the displayed data and provide feedback to the user(s) regarding performance, thereby enabling more real-time or near real-time feedback. For example, as illustrated in FIG. 24, a training/testing screen 412 may include two sets of performance data 414, 416.

Figure 24:
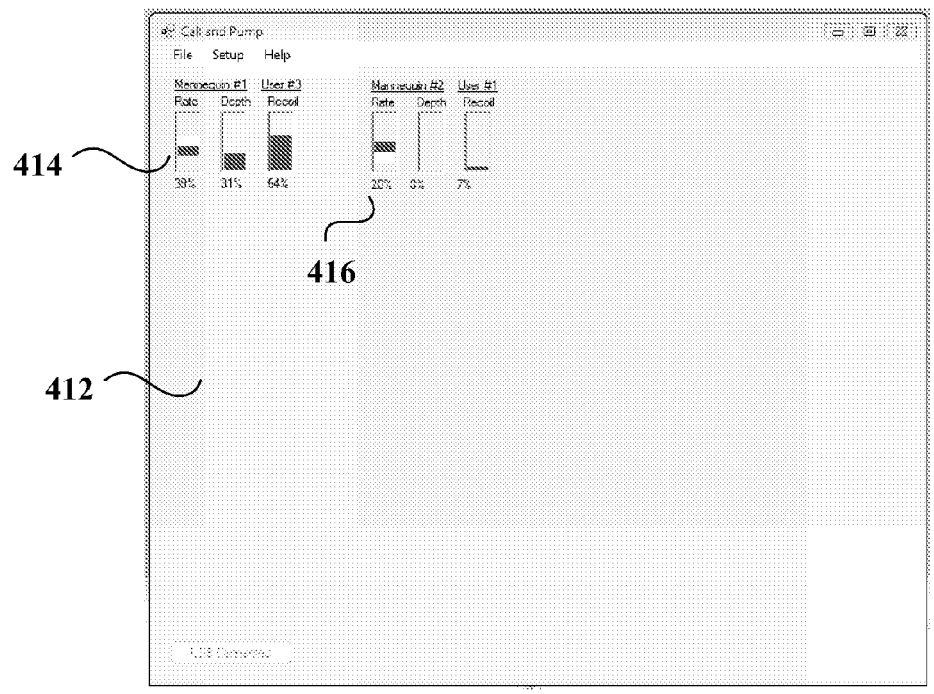
FIG. 24 illustrates an example of a training/testing screen in accordance with one implementation of software running a central CPU coupled to communicate with each of a plurality of mannequin units and with mannequins #1 and #2 registered with the central CPU, wherein performance data has been received from both mannequins and is displayed on the screen using a bar code format.
Figure 25:
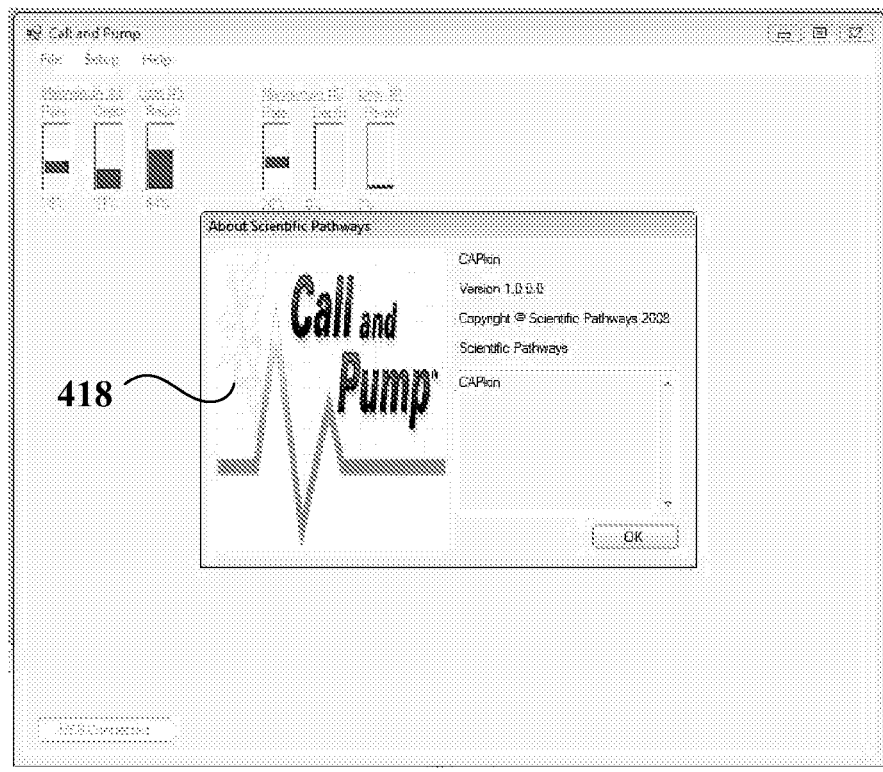
FIG. 25 illustrates an example of a system "about" screen that displays information regarding a version of software running on a central CPU coupled to communicate with each of a plurality of mannequin units.

As shown in FIG. 24, note mannequin #1 is being operated on by user #3 while mannequin #2 is being operated on by user #2, with each of a plurality of mannequin units and with mannequins #1 and #2 registered with the central CPU, wherein performance data has been received from both mannequins and is displayed on the screen using a bar code format. Therefore, it should be appreciated that the data may be displayed on a per-mannequin basis but also on a per-user basis; likewise, the data may be tracked, stored and compared on these bases in order to determine short term and long term performance of particular users as well as diagnose potential operation issues associated with particular mannequins.

Moreover, it should be appreciated that the performance data 408 may be displayed including the rate, depth and recoil data using a real-time, color-coded bar graph that shows both a recent average and a long term average within a single bar graph (not shown).

Furthermore, although the bar graphs shown in the figures are not illustrated in color, it should be understood that the bar graphs will each contain colored data indicating the monitored data in accordance with the settings input by a user as shown in FIG. 16.

Additionally, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of various different entities or individuals.

Further, it should be understood that, in accordance with at least one embodiment of the invention, system components may be implemented together or separately and there may be one or more of any or all of the disclosed system components. Further, system components may be either dedicated systems or such functionality may be implemented as virtual systems implemented on general purpose equipment via software implementations.

Moreover, it should be appreciated that an individual mannequin can be used to train and test a trainee without being connected (via an RF link or otherwise) to a centralized processor for analyzing and recording performance data produced and communicated by the mannequin. Moreover, contrary to the illustrated embodiment provided in FIG. 1, it should be understood that processing and display of performance data may be performed by software residing entirely within a mannequin itself.

Furthermore, it should be appreciated that various alternative methods of analyzing and/or displaying performance data may be provided on the mannequins and/or the centralized processor. Accordingly, for example, although each compression may be analyzed by the centralized processor, a mannequin's display may actually calculate and display performance data for each minute of compression performance by the trainee (rather than on a compression by compression format). Further, raw data may be transmitted from each mannequin to the centralized processor or preprocessed at the mannequin prior to transmission to the processor. Thus, in one alternative, raw data transmitted from each mannequin may be transmitted to the centralized processor and saved in an associated computer or computer readable memory.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

As a result, it will be apparent for those skilled in the art that the illustrative embodiments described are only examples and that various modifications can be made within the scope of the invention as defined in the appended claims.

What is claimed is:

1. A mannequin for detecting and analyzing performance data of a user performing simulated cardiac compressions, the mannequin comprising:
    a fixed-base back structure;
    a chest structure depressible up to a first vertical distance with respect to the back structure;
    a pair of facing magnets secured with respect to one of the chest structure and the back structure and defining a vertical gap therebetween greater than the first vertical distance; and
    a Hall Effect sensor secured with respect to the other of chest structure and the back structure and positioned in the vertical gap,
whereby depressions of the chest structure cause relative movement of the gap with respect to the Hall Effect sensor and thereby produce Hall Effect signals corresponding to the depressions.

2. The mannequin of claim 1 further comprising a return spring positioned between the depressible chest structure and the fixed-base back structure.

3. The mannequin of claim 2 wherein the return spring provides a force that opposes a force generated by a cardiac compression performed by the user so as to simulate recoil associated with anatomical behavior of a human being.

4. The mannequin of claim 1 wherein the pair of facing magnets is secured to the chest structure.

5. A system for monitoring simulated cardiac compressions performed by a plurality of users, the system comprising:
    a plurality of mannequins each including:
        a fixed-base back structure;
        a chest structure depressible up to a first vertical distance with respect to the back structure;
        a pair of facing magnets secured with respect to one of the chest structure and the back structure and defining a vertical gap therebetween greater than the first vertical distance; and
        a Hall Effect sensor secured with respect to the other of the chest structure and the back structure and positioned in the vertical gap such that depressions of the chest structure cause relative movement of the gap with respect to the Hall Effect sensor and thereby produce Hall Effect signals corresponding to the depressions; and
    a centralized processor unit configured to communicate with each of the mannequins to set data associated with ranges of rate, depth and recoil, to receive the performance data detected by each of the corresponding Hall Effect sensors for the plurality of mannequins, and to display at least one graph formulated based on the received performance data.

6. The system of claim 5 wherein each of the plurality of mannequins includes a return spring positioned between the depressible chest structure and the fixed-base back structure.

7. The system of claim 6 wherein each of the return springs provides a force that opposes a force generated by a cardiac compression performed by a respective one of the users so as to simulate recoil associated with anatomical behavior of a human being.

8. The system of claim 5 wherein, for each mannequin, the pair of facing magnets is secured to the chest structure.

9. The system of claim 5 wherein the performance data transmitted to the centralized processor unit are displayed using at least one color coded bar graph that indicates whether the performed depressions are within one of a prescribed set of ranges.

10. The system of claim 9 wherein the prescribed set of ranges of performance data are associated with various colors or symbols indicating best range, middle range and worst range.

11. The system of claim 9 wherein the at least one color coded bar graph includes a specific bar graph for each of depression rate, depression depth, and depression recoil.

12. The system of claim 5 further comprising a touch screen associated with each mannequin, each of the touch screens configured to control operation of the corresponding mannequin and to display performance data detected by the corresponding Hall Effect sensor.

13. The system of claim 12 wherein each of the touch screens displays performance data by using at least one color coded bar graph that indicates whether the depressions are within one of a prescribed set of ranges.

14. The system of claim 13 wherein the prescribed set of ranges of performance data are associated with various colors or symbols respectively indicating best range, middle range and worst range.

15. The system of claim 14 wherein the at least one color coded bar graph includes a specific bar graph for each of depression rate, depression depth and depression recoil.

16. The system of claim 5 wherein the centralized processor unit communicates with the mannequins via at least one radio frequency (RF) link.

17. The system of claim 5 wherein each of the plurality of mannequins further comprises a light emitting diode (LED) and a buzzer configured to provide queues to the respective user for maintaining appropriate parameters of depressions.

18. The system of claim 5 wherein the centralized processor runs software configured to enable tracking and storage of performance data of the plurality of users for the purpose of monitoring users' performance and certifying trained users.

19. A method of obtaining performance data of simulated cardiac compressions, the method comprising:
    providing a mannequin including a fixed-base back structure, a chest structure depressible up to a first vertical distance with respect to the back structure, a pair of facing magnets secured with respect to one of the chest structure and the back structure and defining a vertical gap therebetween greater than the first vertical distance, and a Hall Effect sensor secured with respect to the other of the chest structure and the back structure and positioned in the vertical gap such that depressions of the chest structure cause relative movement of the gap with respect to the Hall Effect sensor and thereby produce Hall Effect signals corresponding to the depressions;
    configuring a processor unit to communicate with the mannequin to set data associated with ranges of rate, depth and recoil;
    performing simulated cardiac compressions by depressing the chest structure thereby moving the pair of magnets with respect to the Hall Effect sensor;
    detecting a magnetic-field change by the Hall Effect sensor; and
    displaying on an associated display at least one graph formulated based on received performance data.

20. The method of claim 19 further comprising using the detected magnetic-field change to calculate the depression rate, depression depth and degree of recoil permitted by the depressions.

21. The method of claim 19 wherein the mannequin includes a touch screen for displaying performance data of the depressions.

22. The method of claim 19 wherein the displaying step is by using at least one color coded bar graph that indicates whether the depressions are within one of a prescribed set of ranges.

23. The method of claim 22 wherein the prescribed set of ranges of performance data are associated with various colors or symbols indicating best range, middle range and worst range.

24. The method of claim 23 wherein the at least one color coded bar graph includes a specific bar graph for each of depression rate, depression depth, and depression recoil.

25. The method of claim 21 wherein the touch screen displays performance data by using at least one color coded bar graph that indicates whether the depressions are within one of a prescribed set of ranges.

26. The method of claim 25 wherein the prescribed set of ranges of performance data are associated with various colors or symbols respectively indicating best range, middle range and worst range.

27. The method of claim 25 further comprising steps of tracking and storing performance data by using software running on the processor to monitor users' performance and certify trained users.

\* \* \* \* \*